United States Patent
Kaga et al.

(10) Patent No.: US 10,181,624 B2
(45) Date of Patent: Jan. 15, 2019

(54) METAL ELECTRODE CARTRIDGE AND METAL-AIR BATTERY

(71) Applicant: Sharp Kabushiki Kaisha, Osaka-shi, Osaka (JP)

(72) Inventors: Masaki Kaga, Osaka (JP); Akihito Yoshida, Osaka (JP); Hirotaka Mizuhata, Osaka (JP); Shinobu Takenaka, Osaka (JP); Masashi Muraoka, Osaka (JP); Shunsuke Sata, Osaka (JP); Tomoharu Arai, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 48 days.

(21) Appl. No.: 14/908,628

(22) PCT Filed: Jul. 22, 2014

(86) PCT No.: PCT/JP2014/069344
§ 371 (c)(1),
(2) Date: Jan. 29, 2016

(87) PCT Pub. No.: WO2015/016100
PCT Pub. Date: Feb. 5, 2015

(65) Prior Publication Data
US 2016/0172728 A1   Jun. 16, 2016

(30) Foreign Application Priority Data
Aug. 1, 2013  (JP) ................................. 2013-160484

(51) Int. Cl.
*H01M 12/02*  (2006.01)
*H01M 12/06*  (2006.01)
*H01M 4/06*   (2006.01)

(52) U.S. Cl.
CPC ............. *H01M 12/02* (2013.01); *H01M 4/06* (2013.01); *H01M 12/06* (2013.01)

(58) Field of Classification Search
None
See application file for complete search history.

(56) References Cited

U.S. PATENT DOCUMENTS

2005/0123815 A1   6/2005  Tsai et al.
2011/0316485 A1*  12/2011 Krishnan .............. H01M 4/244
                                                    320/137

FOREIGN PATENT DOCUMENTS

JP    58-43776 U      3/1983
JP    2005-509262 A   4/2005

OTHER PUBLICATIONS

JPS5843776 (a raw machine translation) (Mar. 24, 1983).*
Official Communication issued in International Patent Application No. PCT/JP2014/069344, dated Aug. 26, 2014.

* cited by examiner

Primary Examiner — Carmen V Lyles-Irving
(74) Attorney, Agent, or Firm — Keating & Bennett, LLP

(57) ABSTRACT

The present invention provides a metal-air battery, wherein a failure in a wiring portion can be repaired easily. The present invention provides a metal electrode cartridge including a first operation portion and a first insertion portion extended from the first operation portion, wherein the first insertion portion includes a first fuel electrode containing a metal serving as an electrode active material, the first operation portion includes a first fuel electrode terminal electrically connected to the first fuel electrode and a first air electrode connection portion, and the first air electrode connection portion includes a first internal connection terminal and a first external connection terminal.

11 Claims, 12 Drawing Sheets

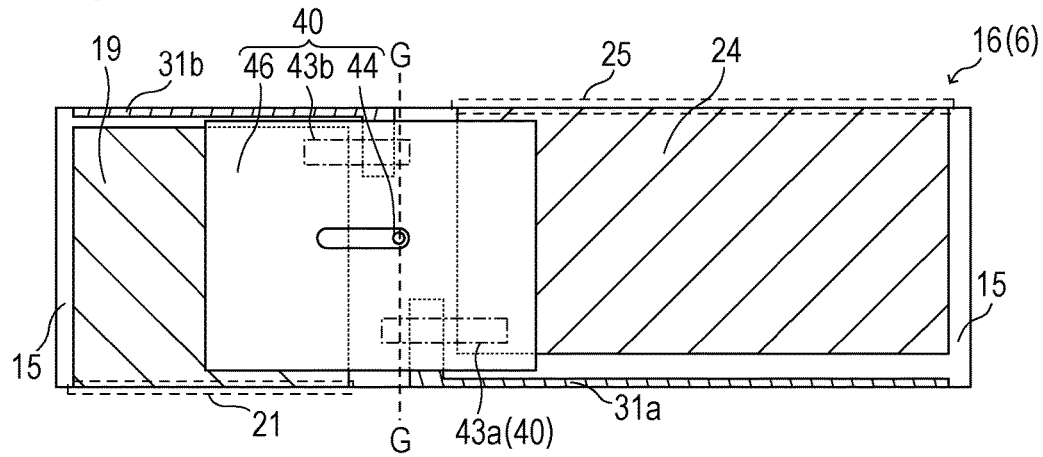
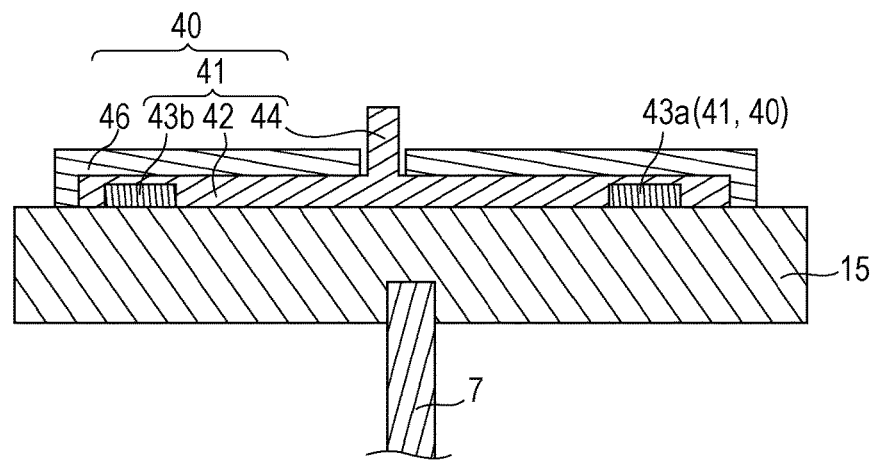
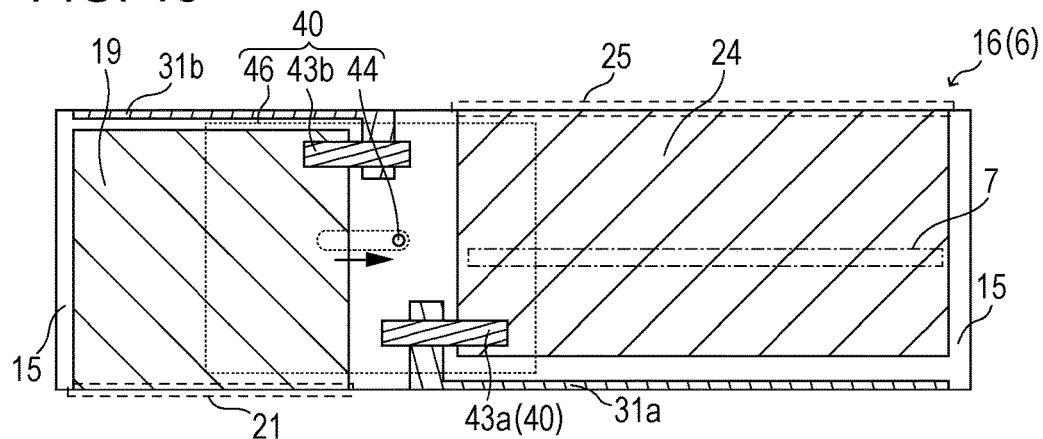

METAL ELECTRODE CARTRIDGE AND METAL-AIR BATTERY

TECHNICAL FIELD

The present invention relates to a metal electrode cartridge used for a metal-air battery and a metal-air battery.

BACKGROUND ART

A metal-air battery has a high energy density and, therefore, is noted as a next-generation battery. The metal-air battery generates electricity, where a fuel electrode containing an electrode active material serving as a fuel is used as an anode and an air electrode is used as a cathode.

A zinc-air battery, in which metal zinc serves as an electrode active material, is mentioned as a typical example of the metal-air batteries. As for the zinc-air battery, it is considered that an electrode reaction represented by Chemical formula 1, as described below, proceeds in the cathode.

$$O_2 + 2H_2O + 4e^- \rightarrow 4OH^-$$ (Chemical formula 1)

Meanwhile, it is considered that electrode reactions represented by Chemical formulae 2 and 3, as described below, proceed in the anode.

$$Zn + 4OH^- \rightarrow Zn(OH)_4^{2-} + 2e^-$$ (Chemical formula 2)

$$Zn(OH)_4^{2-} \rightarrow ZnO + 2OH^- + H_2O$$ (Chemical formula 3)

As such reactions proceed, the electrode active material in the fuel electrode is consumed. Therefore, the metal-air battery has a structure in which the fuel electrode can be exchanged to supply a metal serving as the electrode active material (for example, refer to PTL 1).

Also, the metal-air battery is provided with a plurality of electrochemical cells connected in series or connected in parallel to obtain a large output.

CITATION LIST

Patent Literature

PTL 1: Japanese Unexamined Patent Application Publication (Translation of PCT Application) No. 2005-509262

SUMMARY OF INVENTION

Technical Problem

However, as for the metal-air battery in the related art, wiring for connecting the electrochemical cells in series or in parallel to dispose the fuel electrode exchangeably becomes complicated. Consequently, in the case where a failure occurs in a wiring portion, repair takes a time and the operation of the metal-air battery has to be stopped for a long time.

The present invention has been made in consideration of such circumstances and provides a metal electrode cartridge and a metal-air battery, wherein a failure in a wiring portion can be repaired easily.

Solution to Problem

The present invention provides a metal electrode cartridge including a first operation portion and a first insertion portion extended from the first operation portion, wherein the first insertion portion includes a first fuel electrode containing a metal serving as an electrode active material, the first operation portion includes a first fuel electrode terminal electrically connected to the first fuel electrode and a first air electrode connection portion, and the first air electrode connection portion includes a first internal connection terminal and a first external connection terminal.

Also, the present invention provides a metal-air battery including a first electrolytic solution tank and a metal-air battery main body including a first air electrode and a first air electrode terminal electrically connected to the first air electrode, and the first internal connection terminal is electrically connected to the first air electrode terminal by inserting a first insertion portion of a metal electrode cartridge according to the present invention into the first electrolytic solution tank.

Advantageous Effects of Invention

According to the present invention, a terminal externally connected to an exchangeable metal electrode cartridge is disposed and, therefore, in the case where a failure (rust, deformation, or the like) of the externally connected terminal occurs, the metal-air battery can be repaired easily by exchanging the metal electrode cartridge in use for a new metal electrode cartridge, so that the metal-air battery can be operated again promptly.

BRIEF DESCRIPTION OF DRAWINGS

FIG. 17 is a schematic top view of a metal electrode cartridge included in a metal-air battery according to an embodiment of the present invention.

FIG. 18 is a schematic sectional view of the metal electrode cartridge, along a broken line G-G shown in FIG. 17.

FIG. 19 is a schematic top view of a metal electrode cartridge included in a metal-air battery according to an embodiment of the present invention.

DESCRIPTION OF EMBODIMENTS

Figure 1:
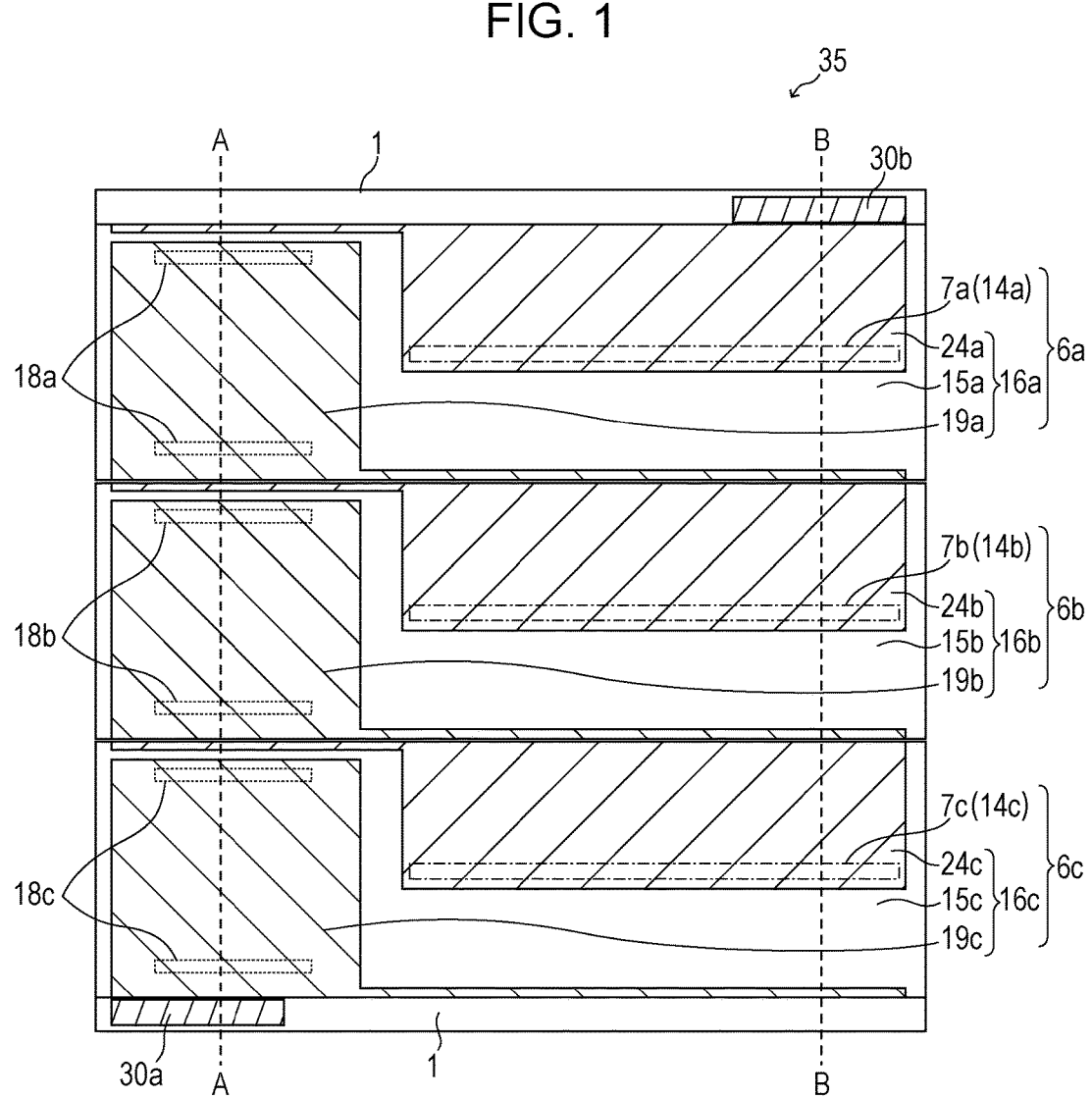
FIG. 1 is a schematic top view of a metal-air battery according to an embodiment of the present invention.

A metal electrode cartridge according to the present invention includes a first operation portion and a first insertion portion extended from the first operation portion, wherein the first insertion portion includes a first fuel electrode containing a metal serving as an electrode active material, the first operation portion includes a first fuel electrode terminal electrically connected to the first fuel electrode and a first air electrode connection portion, and the first air electrode connection portion includes a first internal connection terminal and a first external connection terminal.

A metal-air battery according to the present invention includes a metal-air battery main body and a first metal electrode cartridge detachably disposed on the above-described metal-air battery main body, wherein the above-described metal-air battery main body includes a first electrolytic solution tank, a first air electrode, and a first air electrode terminal electrically connected to the first air electrode, the first metal electrode cartridge includes a first operation portion and a first insertion portion which is extended from the first operation portion and which can be inserted into the first electrolytic solution tank, the first insertion portion includes a first fuel electrode containing a metal serving as an electrode active material, the first operation portion includes a first fuel electrode terminal electrically connected to the first fuel electrode and a first air electrode connection portion, the first air electrode connection portion includes a first internal connection terminal and a first external connection terminal, and the first internal connection terminal is disposed in such a way as to come into contact with the first air electrode terminal by inserting the first insertion portion into the first electrolytic solution tank.

In the metal-air battery according to the present invention, it is preferable that the first fuel electrode terminal or the first internal connection terminal be disposed in such a way as to have movability and be positioned when the first insertion portion is inserted into the first electrolytic solution tank.

According to such a configuration, even in the case where differences occur in positions of air electrode terminals of a plurality of cells, the metal electrode cartridge can be incorporated into the metal-air battery main body smoothly. Also, application of excess load to the air electrode terminal or the internal connection terminal can be suppressed, so that the life of the metal-air battery main body or the metal electrode cartridge can be increased. Also, even in the case where the distance between the air electrode terminals is changed, the metal electrode cartridge can be used on an "as is" basis.

In the metal-air battery according to the present invention, preferably, the first operation portion further includes a switch and switchable terminals and the above-described switchable terminals are disposed in such a way as to be able to be electrically connected to the first fuel electrode terminal or the first external connection terminal by the switch.

According to such a configuration, the switchable terminal is allowed to serve as a fuel electrode side terminal by the switch. Also, the switchable terminal is allowed to serve as an air electrode side terminal by the switch. Consequently, the position of the terminal to output the electromotive force of the cell formed by incorporating the metal electrode cartridge into the metal-air battery main body can be changed and the metal electrode cartridge can be switched back and forth between for series connection use and for parallel connection use. Also, the connection method can be changed by the switch while the metal electrode cartridge is incorporated in the metal-air battery main body and the output of the metal-air battery can be adjusted. Also, it is possible to specify the metal electrode cartridge to be for parallel connection use in the case where the fuel electrode is formed on the fuel electrode collector by a plating method and specify the metal electrode cartridge to be for series connection use in the case where the metal-air battery generates electricity.

It is preferable that the metal-air battery according to the present invention further include a second metal electrode cartridge detachably disposed in the metal-air battery main body, wherein the above-described metal-air battery main body further includes a second electrolytic solution tank, a second air electrode, and a second air electrode terminal electrically connected to the second air electrode, the second metal electrode cartridge includes a second operation portion and a second insertion portion which is extended from the second operation portion and which can be inserted into the second electrolytic solution tank, the second insertion portion includes a second fuel electrode containing a metal serving as an electrode active material, the second operation portion includes a second fuel electrode terminal electrically connected to the second fuel electrode and a second air electrode connection portion, the second air electrode connection portion includes a second internal connection terminal and a second external connection terminal, the second internal connection terminal is disposed in such a way as to come into contact with the second air electrode terminal by inserting the second insertion portion into the second electrolytic solution tank, and the first fuel electrode terminal is disposed in such a way as to come into contact with one of the second fuel electrode terminal and the second external connection terminal by inserting the first insertion portion into the first electrolytic solution tank and inserting the second insertion portion into the second electrolytic solution tank.

According to such a configuration, a plurality of cells included in the metal-air battery can be connected in series or in parallel by incorporating the first metal electrode cartridge and the second metal electrode cartridge into the metal-air battery main body.

In the metal-air battery according to the present invention, preferably, the first fuel electrode terminal is disposed in such a way as to engage with one of the second fuel electrode terminal and the second external connection terminal by inserting the first insertion portion into the first electrolytic solution tank and inserting the second insertion portion into the second electrolytic solution tank.

According to such a configuration, the first metal electrode cartridge and the second metal electrode cartridge can be integrated and an increase in contact resistance and damage of the metal-air battery main body and the metal electrode cartridge due to movement of the metal electrode cartridge can be suppressed.

In the metal-air battery according to the present invention, preferably, one of the first air electrode terminal and the first internal connection terminal has a socket shape and the other has a plug shape.

According to such a configuration, the plug-shaped terminal can be inserted into the socket-shaped terminal by incorporating the metal electrode cartridge into the metal-air battery main body and, thereby, the internal connection terminal is allowed to come into contact with the air electrode terminal. Also, the air electrode terminal can be connected to the internal connection terminal together with attachment of the metal electrode cartridge and the connection between the air electrode terminal and the internal connection terminal can be cut together with detachment of the metal electrode cartridge. Therefore, the metal electrode cartridge is attached to and detached from the metal-air battery main body easily and, in addition, connection of the wiring associated with the attachment and detachment of the metal electrode cartridge is performed easily. Also, in emergency, an electrical conduction path can be interrupted easily by detaching the metal electrode cartridge from the metal-air battery main body.

An embodiment according to the present invention will be described below with reference to the drawings. The configurations shown in the drawings and the descriptions below are exemplifications and the scope of the present invention is not limited to those shown in the drawings and the descriptions below.

Configuration of Metal-air Battery

Figure 2:
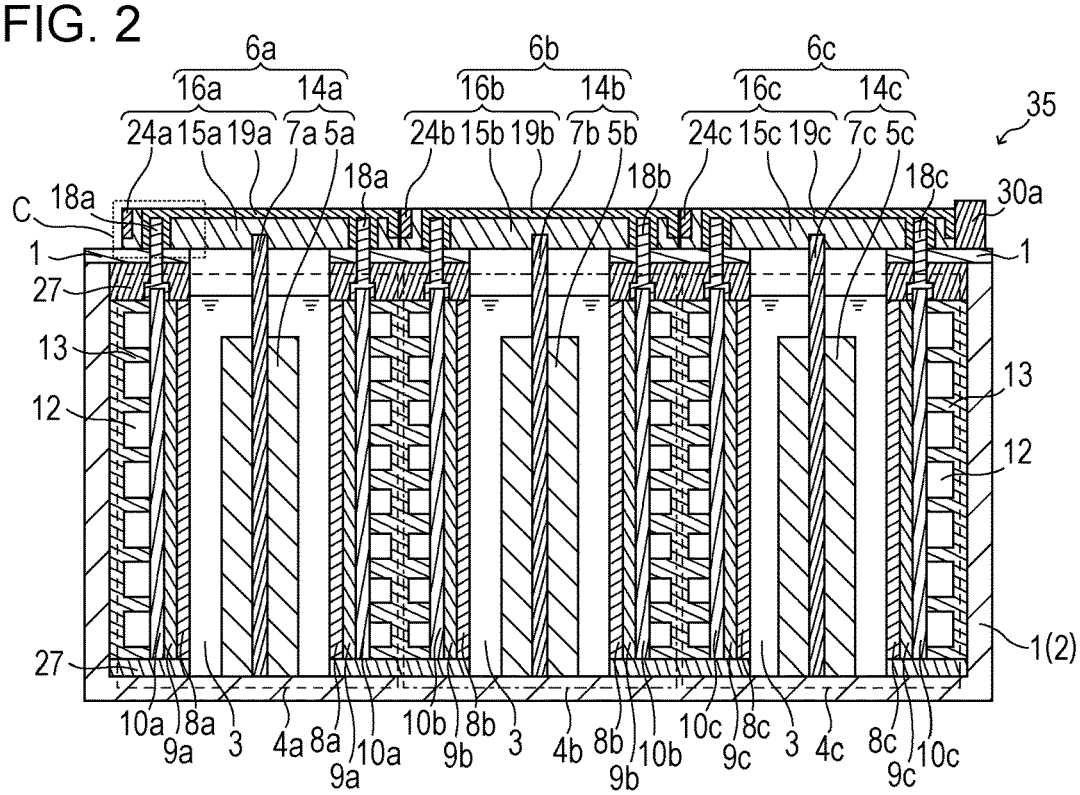
FIG. 2 is a schematic sectional view of the metal-air battery, along a broken line A-A shown in FIG. 1.
Figure 3:
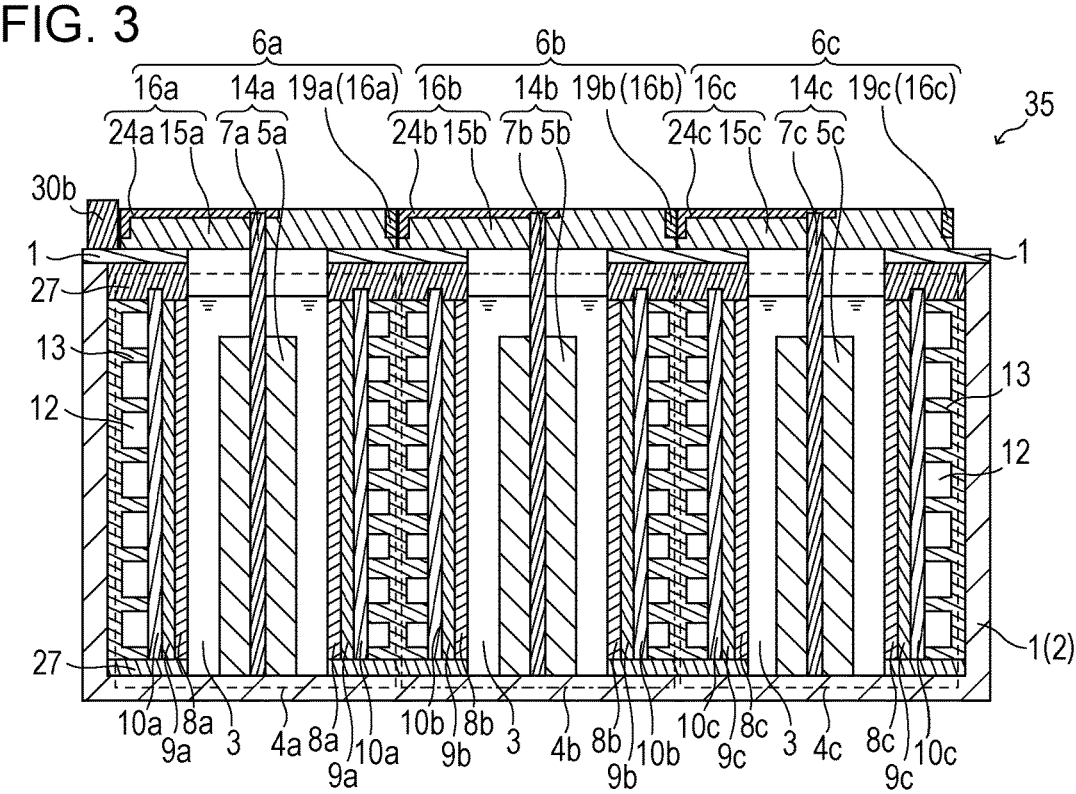
FIG. 3 is a schematic sectional view of the metal-air battery, along a broken line B-B shown in FIG. 1.
Figure 4:
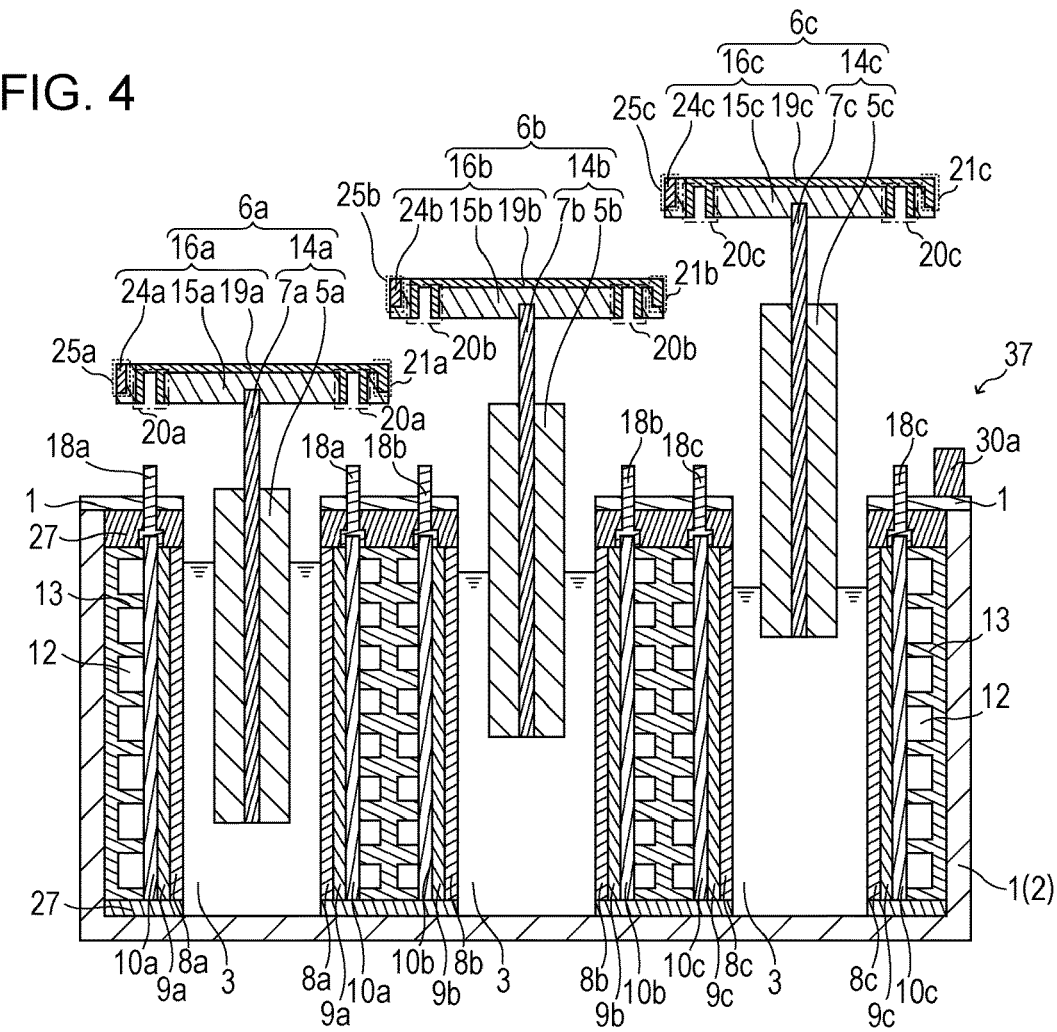
FIG. 4 is a schematic sectional view of the metal-air battery, along a broken line A-A shown in FIG. 1, where the individual cartridges are detached from a metal-air battery main body.
Figure 5:
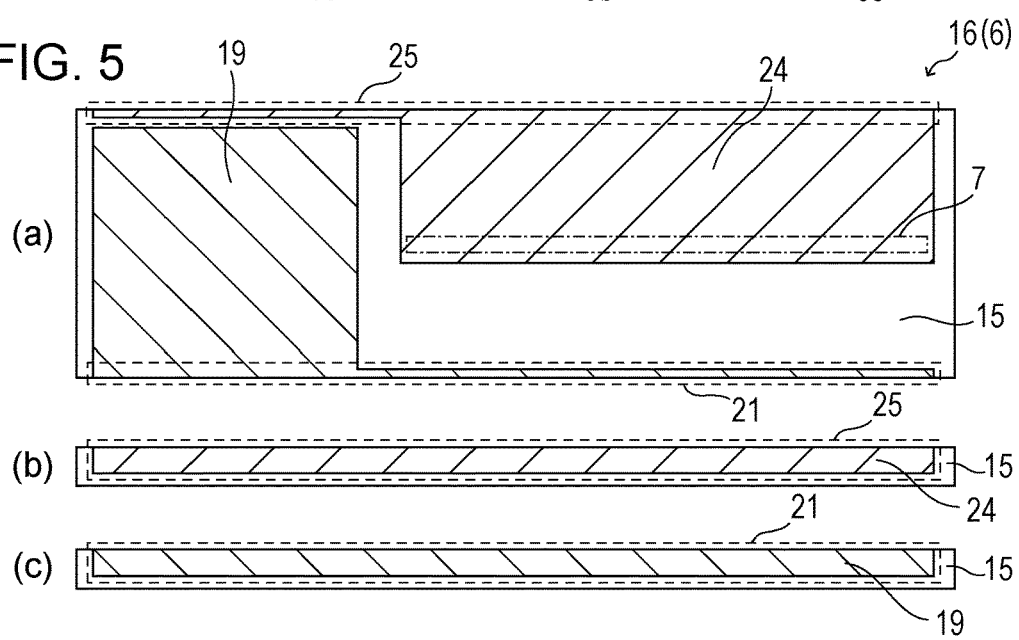
FIG. 5 (a) is a schematic top view of an operation portion of a metal electrode cartridge included in a metal-air battery according to an embodiment of the present invention, and each of FIGS. 5 (b) and (c) is a schematic side view of the above-described operation portion.

FIG. 1 is a schematic top view of a metal-air battery according to the present embodiment. FIG. 2 is a schematic sectional view of the metal-air battery, along a broken line A-A shown in FIG. 1. FIG. 3 is a schematic sectional view of the metal-air battery, along a broken line B-B shown in FIG. 1. FIG. 4 is a schematic sectional view of the metal-air battery, along a broken line A-A shown in FIG. 1, where fuel electrodes of the individual cartridges are at the time of insertion into a metal-air battery main body. FIG. 5 (a) is a schematic top view of an operation portion of the metal electrode cartridge included in a metal-air battery according to the present embodiment, and each of FIGS. 5 (b) and (c) is a schematic side view of the above-described operation portion.

A metal-air battery 35 according to the present embodiment includes a metal-air battery main body 37 and a metal electrode cartridge 6 detachably disposed in the metal-air battery main body 37, wherein the metal-air battery main body 37 includes an electrolytic solution tank 2, an air electrode 9, and an air electrode terminal 18 electrically connected to the air electrode 9, the metal electrode cartridge 6 includes an operation portion 16 and an insertion portion 14 extended from the operation portion 16, the insertion portion 14 includes a fuel electrode 5 containing a metal serving as an electrode active material, the operation portion 16 includes a fuel electrode terminal 25 electrically connected to the fuel electrode 5 and an air electrode connection portion 19, the air electrode connection portion 19 includes an internal connection terminal 20 and an external connection terminal 21, and the internal connection terminal 20 is disposed in such a way as to come into contact with the air electrode terminal 18 by inserting the insertion portion 14 into the electrolytic solution tank 2.

The metal-air battery 35 according to the present embodiment will be described below.

1. Metal-air Battery

The metal-air battery 35 according to the present embodiment is a battery in which the fuel electrode 5 containing the metal serving as the electrode active material is specified to be a negative electrode (anode) and the air electrode 9 is specified to be a positive electrode (cathode). For example, a zinc-air battery, a lithium-air battery, a sodium-air battery, a calcium-air battery, a magnesium-air battery, an aluminum-air battery, an iron-air battery, and the like are mentioned. Also, the metal-air battery 35 according to the present embodiment may be a primary battery.

Meanwhile, the metal-air battery 35 is formed from the metal-air battery main body 37 composed of the electrolytic solution tank 2, the air electrode 9, the air electrode terminal 18, and the like and the metal electrode cartridge 6 having a structure which can be attached to or detached from the metal-air battery main body 37.

2. Cell

A cell 4 is a configuration unit of the metal-air battery 35 and includes an electrode pair composed of the fuel electrode 5 serving as the anode and the air electrode 9 serving as the cathode. In the cell 4, one air electrode 9 and one fuel electrode 5 may be disposed in such a way as to sandwich an electrolytic solution 3 or, as in the case of the metal-air battery 35 shown in FIGS. 1 to 3, two air electrodes 9 may be disposed in such a way as to sandwich one fuel electrode 5.

Meanwhile, the metal-air battery 35 may have a single cell structure including one cell or a stack structure including a plurality of cells 4, as in the case of the metal-air battery 35 shown in FIGS. 1 to 3.

In the case where the metal-air battery 35 has a stack structure, a plurality of cells 4 may be connected in series or be connected in parallel. In the metal-air battery 35 shown in FIGS. 1 to 3, three cells 4a, 4b, and 4c are connected in series.

In this regard, the method for connecting the cell 4 and external wiring and the method for connecting the plurality of cells 4 will be described later.

3. Electrolytic Solution Tank and Electrolytic Solution

The electrolytic solution tank 2 is an electrolytic tank to store the electrolytic solution 3 and has the corrosion resistance to the electrolytic solution. Also, the electrolytic solution tank 2 has a structure in which the fuel electrode 5 can be disposed therein. Meanwhile, in the case where the metal-air battery 35 includes a plurality of cells 4, each cell 4 may independently have the electrolytic solution tank 2, the electrolytic solution tanks 2 of the individual cells 4 may communicate with each other by flow paths, or all cells 4 may share one electrolytic solution tank 2. In this regard, in the metal-air battery 35 shown in FIGS. 1 to 3, the bottom and part of the side wall of the electrolytic solution tank 2 are a casing 1 and part of the side wall of the electrolytic solution tank 2 is an ion exchange membrane 8.

The material for the casing 1 constituting the electrolytic solution tank 2 is not specifically limited insofar as the material has the corrosion resistance to the electrolytic solution 3. Examples include polyvinyl chlorides (PVC), polyvinyl alcohols (PVA), polyvinyl acetates, ABS, vinylidene chloride, polyacetals, polyethylenes, polypropylenes, polyisobutylenes, fluororesins, and epoxy resins.

The electrolytic solution 3 is a liquid having ionic conductivity, in which an electrolyte is dissolved in a solvent. The electrolytic solution 3 may be an electrolytic solution by using an aqueous solvent (electrolyte aqueous solution) or be an electrolytic solution by using an organic solvent (organic electrolytic solution), although the type is different depending on the type of the metal constituting the fuel electrode 5.

For example, in the case of the zinc-air battery, the aluminum-air battery, and the iron-air battery, alkaline aqueous solutions, e.g., a sodium hydroxide aqueous solution and a potassium hydroxide aqueous solution, can be used as the electrolytic solution and in the case of the magnesium-air battery, a sodium chloride aqueous solution can be used as the electrolytic solution. Also, in the case of the lithium metal battery, the sodium-air battery, and the calcium-air battery, the organic electrolytic solutions can be used.

Alternatively, the electrolytic solution tank 2 may have a partition wall made of a solid electrolyte and the electrolyte aqueous solution may be stored into one side partitioned by the partition wall and the organic electrolytic solution may be stored into the other side.

Also, the metal-air battery 35 may have a mechanism to fluidize the electrolytic solution. Consequently, a battery reaction in the fuel electrode 5 and the electrolytic solution 3 can be facilitated and the performance of the metal-air battery 35 can be improved. As for the mechanism to fluidize the electrolytic solution, the electrolytic solution 3 may be circulated by using a pump and, thereby, the electrolytic solution 3 in the electrolytic solution tank 2 may be fluidized. Alternatively, the metal-air battery 35 may include a movement portion, e.g., an agitator or a vibrator, which can physically move the electrolytic solution 3 in the electrolytic solution tank 2.

4. Air Electrode, Air Electrode Connection Terminal, and Ion Exchange Membrane

The air electrode 9 is an electrode serving as the cathode. At the air electrode 9, hydroxide ions ($OH^-$) are generated from an oxygen gas in the air, water, and electrons. The air electrode 9 is formed from, for example, an electrically conductive porous carrier and an air electrode catalyst carried by the porous carrier. Consequently, on the air electrode catalyst, it is possible that the oxygen gas, water, and electrons are present together and it is possible that the electrode reaction proceeds. The water used for the electrode reaction may be supplied from the air or be supplied from the electrolytic solution.

Alternatively, the air electrode 9 may be produced by applying the porous carrier carrying the air electrode catalyst to an electrically conductive porous base material. For example, the air electrode 9 can be produced by applying carbon carrying the air electrode catalyst to carbon paper or carbon felt. In this regard, this electrically conductive porous base material may be allowed to function as an air electrode collector 10.

Also, the air electrode 9 may include the air electrode collector 10 to collect the charge of the air electrode catalyst, as in the case of the metal-air battery 35 shown in FIGS. 1 to 3. Consequently, the electromotive force of the cell 4 can be output externally efficiently. The material for the air electrode collector 10 is not specifically limited insofar as the corrosion resistance to the electrolytic solution is exhibited. For example, nickel, gold, silver, copper, and stainless steel are mentioned. Also, the collector electrode may be, for example, an electrically conductive material subjected to a nickel plating treatment, gold plating treatment, silver plating treatment, or copper plating treatment. As for this electrically conductive base material, iron, nickel, stainless steel, or the like can be used.

Also, the shape of the air electrode collector 10 can be specified to be, for example, a tubular shape, a mesh shape, and a punching metal.

Meanwhile, examples of methods for joining the air electrode collector 10 and the porous carrier or the electrically conductive porous base material include a method in which contact bonding is performed by screwing through a frame and a method in which bonding is performed by using an electrically conductive adhesive.

The air electrode terminal 18 is a terminal on the air electrode 9 side when the electromotive force of the cell 4 is output externally and is electrically connected to the air electrode 9. Also, the air electrode terminal 18 is disposed in the metal-air battery main body 37. The air electrode terminal 18 may be part of the air electrode collector 10 insofar as the function as the terminal can be performed. Also, the air electrode terminal 18 may be a member to come into contact with the air electrode 9 or be a member to come into contact with the air electrode collector 10. For example, the air electrode terminal 18 can be disposed in such a way as to come into contact with the air electrode collector 10, as in the case of the metal-air battery 35 shown in FIGS. 1 to 4.

The air electrode terminal 18 is disposed in such a way as to come into contact with the internal connection terminal 20 by inserting the fuel electrode 5 into the electrolytic solution tank 2. Consequently, the electromotive force of the cell 4 can be output through the air electrode connection portion 19. Also, the air electrode terminal 18 may have a socket shape or have a plug shape. Also, the air electrode terminal 18 may be disposed in such a way as to have movability and be positioned when the insertion portion 14 is inserted into the electrolytic solution tank 2. This will be described later.

The air electrode 9 included in one cell 4 may be disposed on only one side of the fuel electrode 5 or be disposed on each of both sides of the fuel electrode 5, as shown in FIGS. 2 and 3.

Examples of the porous carriers contained in the air electrode 9 include carbon black, e.g., acetylene black, furnace black, channel black, and Ketjenblack, and electrically conductive carbon particles of graphite, activated carbon, and the like. In addition, carbon fibers, e.g., vapor-grown carbon fibers (VGCF), carbon nanotubes, and carbon nanowires, can also be used.

Examples of air electrode catalysts include platinum, iron, cobalt, nickel, palladium, silver, ruthenium, iridium, molybdenum, manganese, metal compounds thereof, and fine particles made of alloys containing at least two types of these metals. These alloys are preferably alloys containing at least two types of platinum, iron, cobalt, and nickel, and examples include platinum-iron alloys, platinum-cobalt alloys, iron-cobalt alloys, cobalt-nickel alloys, iron-nickel alloys, and iron-cobalt-nickel alloys.

Also, the porous carrier contained in the air electrode 9 may be subjected to a surface treatment in such a way that a cation group serving as a fixed ion is present on the surface thereof. Consequently, hydroxide ions can be conducted on the surface of the porous carrier, so that hydroxide ions generated on the air electrode catalyst move easily.

Also, the air electrode 9 may have anion exchange resin carried by the porous carrier. Consequently, hydroxide ions can be conducted through the anion exchange resin, so that hydroxide ions generated on the air electrode catalyst move easily.

The air electrode 9 may be disposed in such a way as to come into direct contact with the air or be disposed in contact with an air flow path 12. Consequently, an oxygen gas can be supplied to the air electrode 9. Also, in the case where the air flow path 12 is disposed, water can also be supplied together with the oxygen gas to the air electrode 9 by feeding humidified air into the air flow path 12. The air fed to the air flow path 12 can be supplied from, for example, the side portion of the metal-air battery 35 with a blower.

The air flow path 12 can be disposed in, for example, a flow path member 13 included in the metal-air battery 35 shown in FIGS. 1 to 3.

In this regard, the flow path member 13 may be formed from an insulating material.

The air electrode 9 may be disposed in such a way as to come into contact with the electrolytic solution 3 stored into the electrolytic solution tank 2. Consequently, hydroxide ions generated at the air electrode 9 can move easily to the electrolytic solution 3. Also, water required for the electrode reaction at the air electrode 9 is supplied from the electrolytic solution 3 to the air electrode 9 easily.

Alternatively, the air electrode 9 may be disposed in such a way as to come into contact with the ion exchange membrane 8 in contact with the electrolytic solution 3 stored in the electrolytic solution tank 2. The ion exchange membrane 8 may be an anion exchange membrane. Consequently, hydroxide ions generated at the air electrode 9 can be conducted through the anion exchange membrane and move to the electrolytic solution.

The ion species which moves between the air electrode 9 and the electrolytic solution 3 can be limited by disposing the ion exchange membrane 8. In the case where the ion exchange membrane 8 is the anion exchange membrane, the anion exchange membrane has a cation group serving as the fixed ion and, thereby, the cation in the electrolytic solution cannot be conducted to the air electrode 9. On the other hand, the hydroxide ion generated at the air electrode 9 is an anion and, therefore, can be conducted to the electrolytic solution. Consequently, the battery reaction of the metal-air battery 35 is allowed to proceed and movement of the cation in the electrolytic solution 3 to the air electrode 9 can be prevented. Consequently, deposition of metals and carbonate compounds at the air electrode 9 can be suppressed.

Also, excessive supply of water contained in the electrolytic solution to the air electrode 9 can be suppressed by disposing the ion exchange membrane 8.

Examples of ion exchange membranes 8 include perfluorosulfonic acid based, perfluorocarboxylic acid based, styrene vinylbenzene based, and quaternary ammonium based solid polymer electrolyte membranes (anion exchange membranes).

5. Metal Electrode Cartridge, Fuel Electrode, Operation Portion, Fuel Electrode Terminal, and Air Electrode Connection Portion The metal electrode cartridge 6 is detachably disposed in the metal-air battery main body 37 to exchange the fuel electrode 5 included in the metal-air battery 35.

The metal electrode cartridge 6 includes an operation portion 16 and an insertion portion 14 which is extended from the operation portion 16 and which can be inserted into the electrolytic solution tank 2. Consequently, the insertion portion 14 can be inserted into the electrolytic solution tank 2 and be pulled out of the electrolytic solution tank 2 by operating the operation portion 16. Also, the operation portion 16 may function as a lid of the electrolytic solution tank 2. Consequently, an electrode insertion hole can be blocked in association with insertion of the fuel electrode 5 into the electrolytic solution tank 2, so that the reaction between the component in the air and the electrolytic solution 3 can be suppressed. For example, in the case where an alkaline electrolytic solution is used as the electrolytic solution, neutralization of the alkaline electrolytic solution due to dissolution of carbon dioxide gas in the air into the electrolytic solution can be suppressed.

The shape of the metal electrode cartridge 6 is not specifically limited. For example, it is possible to have a T-shaped cross-section, as in the case of metal electrode cartridges 6a to 6c included in the metal-air battery shown in FIG. 4. In this cross-section, as shown in FIG. 4, the horizontally extended portion can serve as the operation portion 16 and the vertically extended portion can serve as the insertion portion 14. Also, each of the operation portion 16 and the insertion portion 14 may have a tabular shape. Also, the operation portion 16 included in the metal electrode cartridge 6 may have a structure shown in, for example, FIGS. 5 (a) to (c).

Alternatively, the metal electrode cartridge 6 may have an L-shaped cross-section.

The metal electrode cartridge 6 may include a plurality of insertion portions 14. Consequently, the plurality of insertion portions 14 can be inserted into the corresponding electrolytic solution tank 2 at the same time, so that generation of electricity can be started in the plurality of cells 4 at the same time. Consequently, degradation of the fuel electrode 5 or the electrolytic solution 3 can be suppressed. In this regard, the fuel electrodes 5 included in the individual insertion portions 14 serve as electrodes of different cells 4.

Figure 6:
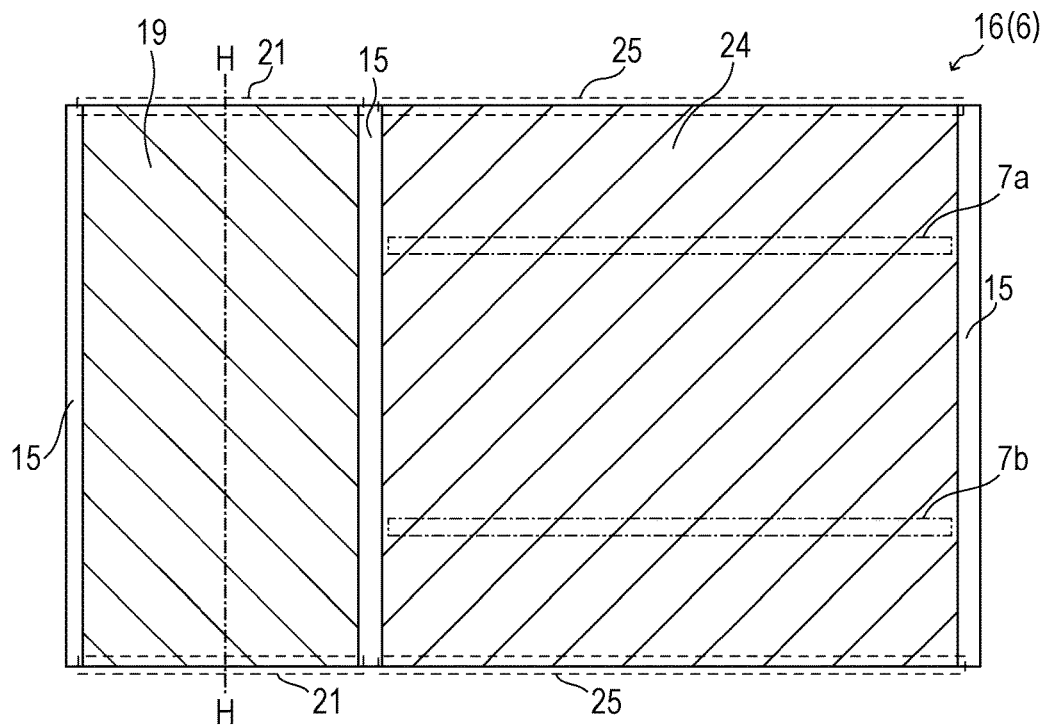
FIG. 6 is a schematic top view of a metal electrode cartridge included in a metal-air battery according to an embodiment of the present invention.
Figure 7:
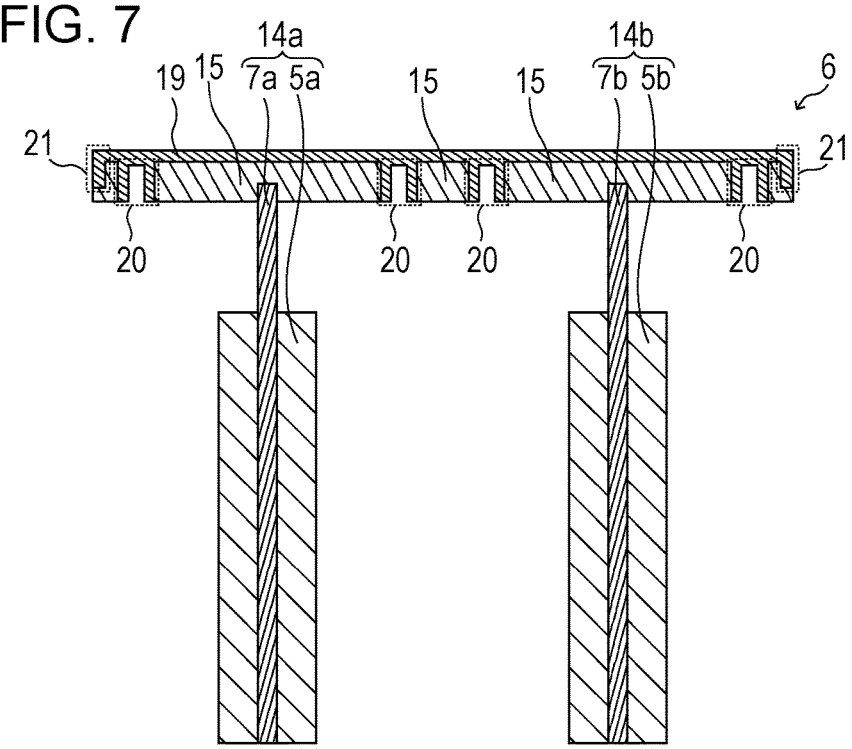
FIG. 7 is a schematic sectional view of the metal electrode cartridge, along alternate long and short dashed lines H-H shown in FIG. 6.
Figure 8:
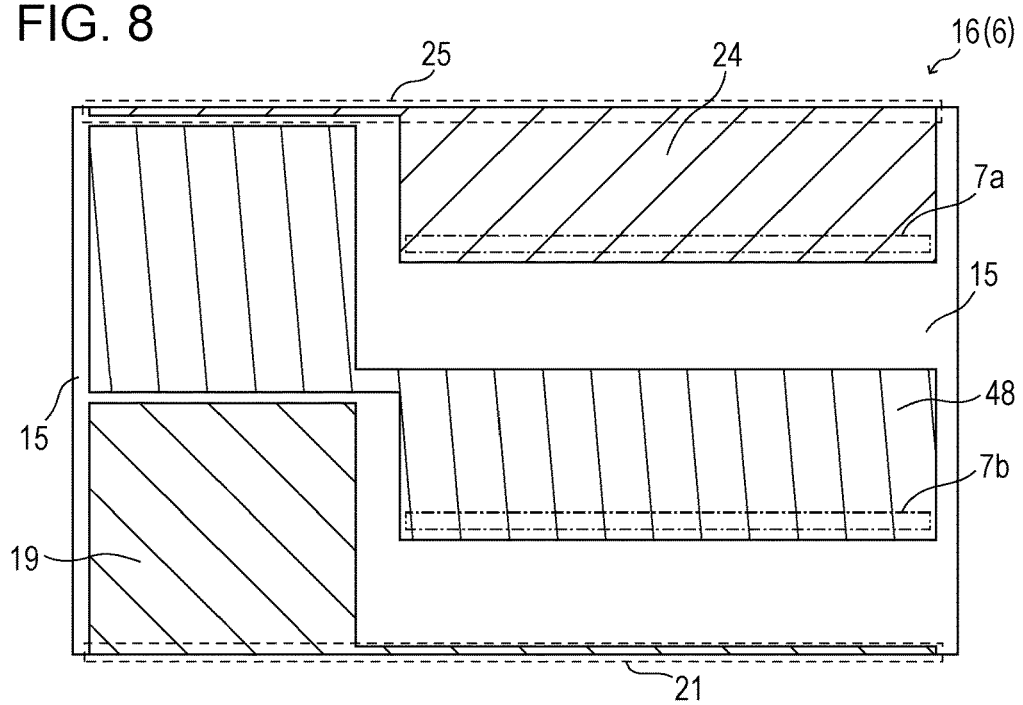
FIG. 8 is a schematic top view of a metal electrode cartridge included in a metal-air battery according to an embodiment of the present invention.

FIG. 6 is a schematic top view of the metal electrode cartridge 6 included in the metal-air battery 35 according to the present embodiment. FIG. 7 is a schematic sectional view of the metal electrode cartridge 6, along alternate long and short dashed lines H-H shown in FIG. 6. Also, FIG. 8 is a schematic top view of the metal electrode cartridge 6 included in the metal-air battery 35 according to the present embodiment.

For example, as shown in FIG. 7, the metal electrode cartridge 6 can include two insertion portions 14a and 14b. In the case where such a metal electrode cartridge 6 is used, the fuel electrodes 5a and 5b of adjacent two cells 4 can be inserted into the corresponding electrolytic solution tank 2 at the same time. In this regard, the electrical connection relationship between the individual cells 4 included in the metal-air battery 35 provided with the metal electrode cartridge 6 including a plurality of insertion portions 14 will be described later.

The insertion portion 14 includes the fuel electrode 5 containing a metal serving as an electrode active material. Consequently, the fuel electrode 5 can be inserted into the electrolytic solution tank 2 and be pulled off the electrolytic solution tank 2. Therefore, the electrode active material can be supplied to the metal-air battery 35 by detaching the metal electrode cartridge 6, in which the electrode active material contained in the fuel electrode 5 has been consumed due to proceeding of the electrode reaction, from the metal-air battery main body 37 and attaching the metal electrode cartridge 6 including a new fuel electrode 5 to the metal-air battery main body 37.

The fuel electrode 5 is arranged in the electrolytic solution 3 by inserting the insertion portion 14 into the electrolytic solution tank 2. Consequently, the electrode reaction is allowed to proceed on the surface of the fuel electrode 5.

The insertion portion 14 may be formed from only the fuel electrode 5 or be formed from the fuel electrode 5 and the fuel electrode collector 7.

The fuel electrode 5 is an electrode serving as the anode and contains a metal serving as the electrode active material. Also, the fuel electrode 5 may be disposed on the fuel electrode collector 7. Consequently, charges generated through the electrode reaction can be output efficiently. The fuel electrode collector 7 may function as a support member to support the fuel electrode 5. The fuel electrode collector 7 is made of a material having the corrosion resistance to the electrolytic solution and the electrical conductivity.

The electrode active material contained in the fuel electrode 5 is a metal which release electrons on the basis of the discharging reaction of the battery and is chemically changed to deposits of metal compounds (fine particles, acicular particles, tabular particles, and the like).

For example, in the case of the zinc-air battery, the fuel electrode 5 is made of metal zinc and the metal compound is zinc oxide or zinc hydroxide. In the case of the aluminum-air battery, the fuel electrode 5 is made of metal aluminum and the metal compound is aluminum hydroxide. In the case of the iron-air battery, the fuel electrode 5 is made of metal iron and the metal compound is iron oxide-hydroxide or iron oxide. In the case of the magnesium-air battery, the fuel electrode 5 is made of metal magnesium and the metal compound is magnesium hydroxide.

Also, in the case of the lithium-air battery, the sodium-air battery, and the calcium-air battery, the fuel electrodes 5 are made of metal lithium, metal sodium, and metal calcium, respectively, and the metal compounds are oxides, hydroxides, and the like thereof.

In this regard, the electrode active material and the metal compound are not limited to these examples insofar as the metal-air battery is produced. Also, as for the electrode active material contained in the fuel electrode 5, the metal composed of one type of metal element has been mentioned in the above-described example, although the fuel electrode 5 may be made of an alloy.

The chemical change from the electrode active material to the deposit of the metal compound due to proceeding of the discharge reaction of the battery may occur at the fuel electrode 5 or both the fuel electrode 5 and the electrolytic solution 3. For example, at the fuel electrode 5, the metal serving as the electrode active material may react with ions contained in the electrolytic solution 3, ions containing the above-described metal may be generated in the electrolytic solution 3, and the deposit of the metal compound may be generated by decomposition of the ions containing the metal. Also, at the fuel electrode 5, the metal serving as the electrode active material may reacts with ions contained in the electrolytic solution 3 and the deposit of the metal compound may be generated. Also, at the fuel electrode 5, the metal serving as the electrode active material may be dissolved as metal ions into the electrolytic solution 3, and the resulting metal ions may react in the electrolytic solution and the deposit of the metal compound may be generated.

Meanwhile, in the case where at least two types of electrolytic solutions are used, at the fuel electrode 5, the metal serving as the electrode active material may be dissolved as metal ions into a first electrolytic solution, and the resulting metal ions may move to a second electrolytic solution, and the metal compound may be generated. In this regard, at least two types of electrolytic solutions can be partitioned with a solid electrolyte.

Also, the deposit of the metal compound may be recovered as a used active material by a used active material recovery mechanism.

The fuel electrode 5 can be fixed to a key surface of the fuel electrode collector 7. The fuel electrode collector 7 has the electrical conductivity and the shape is not limited insofar as the fuel electrode 5 can be fixed. For example, a tabular shape, a tubular shape, a spherical shape, a linear shape, a mesh shape, a punching metal, and the like can be employed. Also, this fuel electrode collector 7 can be formed from, for example, a metal plate having the corrosion resistance to the electrolytic solution. The material for the fuel electrode collector 7 is, for example, nickel, gold, silver, copper, stainless steel, or the like. Also, the fuel electrode collector 7 may be, for example, an electrically conductive base material subjected to a nickel plating treatment, gold plating treatment, silver plating treatment, or copper plating treatment. As for this electrically conductive base material, iron, nickel, stainless steel, or the like can be used.

Consequently, the electricity can be collected from the fuel electrode 5 through the fuel electrode collector 7. As for the fixing of the fuel electrode 5 to the key surface of the fuel electrode collector 7, for example, fixing may be performed by pressing particles or blocks of the metal serving as the electrode active material against the surface of the fuel electrode collector 7 or the metal may be deposited on the fuel electrode collector 7 by a plating method or the like.

In this regard, in the case where the fuel electrode 5 is formed again in the metal electrode cartridge 6, in which the fuel electrode 5 has been consumed, by the plating method, the insertion portion 14 can be dipped into a plating solution.

The operation portion 16 includes the fuel electrode terminal 25 electrically connected to the fuel electrode 5. Consequently, the terminal on the fuel electrode 5 side of the cell 4 can be disposed in the operation portion 16. In this regard, the operation portion 16 can include a base member 15, and the fuel electrode terminal 25 can be disposed on the base member 15. The base member 15 may be made of an insulating material.

Meanwhile, the shape of the operation portion 16 is not specifically limited and the shape may be changed to the shape of a prism, circular column, or the like appropriately in accordance with the shape of the metal electrode cartridge 6 or the metal-air battery 35.

The fuel electrode terminal 25 may be part of the fuel electrode collector 7 or be part of the fuel electrode connection portions 24a to 24c disposed in the operation portion 16, as in the case of the fuel electrode terminals 25a to 25c included in the metal-air battery 35 shown in FIGS. 1 to 4. The fuel electrode terminal 25 is disposed preferably in such a way as to be exposed at the surface of the operation portion 16 and can be disposed on, for example, the side surface of the operation portion 16, as in the case of the operation portion 16 shown in FIGS. 5 (a) and (b) and FIGS. 6 to 8. Consequently, when the metal electrode cartridge 6 is incorporated into the metal-air battery main body 37, the fuel electrode terminal 25 and the terminal or wiring adjacent to the operation portion 16 are allowed to become contact with each other.

Meanwhile, the fuel electrode connection portion 24 can come into contact with the fuel electrode collector 7. In the metal-air battery 35 shown in FIG. 1, the fuel electrode collector 7 is in contact with the fuel electrode connection portion 24 in the ranges surrounded by the alternate long and short dashed lines. In this regard, the fuel electrode connection portion 24 is made of an electrically conductive material, e.g., a metal.

Also, the fuel electrode connection portion 24 may be formed from one member or be formed from a plurality of electrically connected members.

Also, the surface of the fuel electrode connection portion 24 excluding the fuel electrode terminal 25 may be covered with an insulating material. Consequently, the safety of the metal-air battery 35 can be improved.

The fuel electrode terminal 25 can come into contact with any one of the external wiring, an output terminal 30, the fuel electrode terminal 25 of the adjacent cell 4, and the external connection terminal 21 of the adjacent cell 4 when the metal electrode cartridge 6 is attached to the metal-air battery main body 37. Also, the fuel electrode terminal 25 is allowed to be in no contact with the external wiring, the output terminal 30, the fuel electrode terminal 25 of the adjacent cell 4, and the external connection terminal 21 of the adjacent cell 4 when the metal electrode cartridge 6 is detached from the metal-air battery main body 37.

According to such a configuration, the electromotive force of the cell 4 can be output externally by attaching the metal electrode cartridge 6 to the metal-air battery main body 37. Also, proceeding of the electrode reaction in the cell 4 can be interrupted by detaching the metal electrode cartridge 6 from the metal-air battery main body 37. In addition, when failures, e.g., rust and deformation, occur at the terminal to output the electromotive force of the cell 4, generation of electricity with the cell 4 can be started again promptly by detaching the metal electrode cartridge 6 from the metal-air battery main body 37 and attaching a new metal electrode cartridge 6 to the metal-air battery main body 37.

The connection method of the fuel electrode terminal 25 and the like will be described later.

The operation portion 16 includes the air electrode connection portion 19 including the internal connection terminal 20 and the external connection terminal 21, and the internal connection terminal 20 is disposed in such a way as to come into contact with the air electrode terminal 18 by inserting the insertion portion 14 into the electrolytic solution tank 2. Consequently, the air electrode 9 can be electrically connected to the air electrode connection portion 19 when the metal electrode cartridge 6 is incorporated into the metal-air battery main body 37 and the electrical connection between the air electrode 9 and the air electrode connection portion 19 can be cut when the metal electrode cartridge 6 is detached from the metal-air battery main body 37. Consequently, the terminal on the air electrode 9 side of the cell 4 when the electrochemical reaction is allowed to proceed in the cell 4 can be specified to be the external connection terminal 21 included in the operation portion 16.

In this regard, the air electrode connection portion 19 may be formed from one member or be formed from a plurality of electrically connected members. Also, the air electrode connection portion 19 may be disposed on the base member 15 of the operation portion 16. Also, the air electrode connection portion 19 is made of an electrically conductive material, e.g., a metal.

Also, the surface of the air electrode connection portion 19 excluding the internal connection terminal 20 and the external connection terminal 21 may be covered with an insulating material. Consequently, the safety of the metal-air battery 35 can be improved.

The internal connection terminal 20 can be disposed as the lower part of the operation portion 16. Consequently, the internal connection terminal 20 can be connected to the air electrode terminal 18 by incorporating the metal electrode cartridge 6 into the metal-air battery main body 37.

For example, one of the internal connection terminal 20 and the air electrode terminal 18 can have a socket shape and the other can have a plug shape. Consequently, the plug-shaped terminal can be inserted into the socket-shaped terminal by incorporating the metal electrode cartridge 6 into the metal-air battery main body 37 and, thereby, the internal connection terminal 20 is allowed to come into contact with the air electrode terminal 18. Also, the air electrode terminal 18 can be connected to the internal connection terminal 20 together with attachment of the metal electrode cartridge 6 and the connection between the air electrode terminal 18 and the internal connection terminal 20 can be cut together with detachment of the metal electrode cartridge 6. Therefore, the metal electrode cartridge 6 is attached to and detached from the metal-air battery main body 37 easily and, in addition, connection of the wiring associated with the attachment and detachment of the metal electrode cartridge 6 is performed easily. Also, in emergency, an electrical conduction path can be interrupted easily by detaching the metal electrode cartridge 6 from the metal-air battery main body.

In the metal-air battery 35 shown in FIGS. 1 to 4, the internal connection terminals 20*a* to 20*c* have the socket shape and the air electrode terminals 18*a* to 18*c* have the plug shape.

Figure 9:
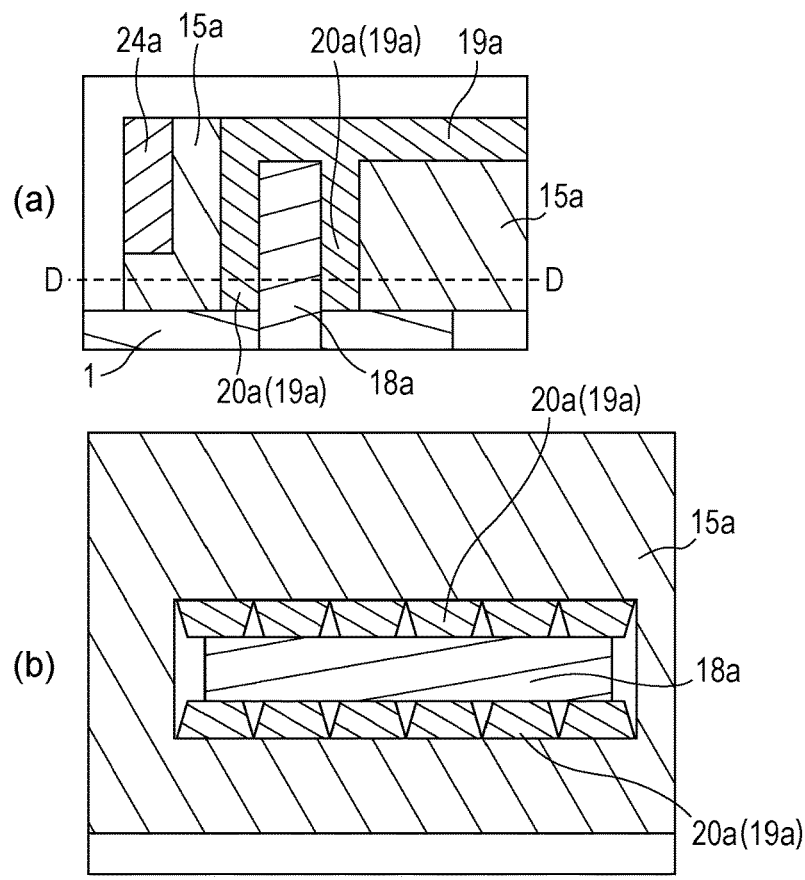
FIG. 9 (a) is a schematic sectional view of the metal-air battery in the range C surrounded by a dotted line shown in FIG. 2, and FIG. 9 (b) is a schematic sectional view of the metal-air battery, along a broken line D-D shown in FIG. 9 (a).

FIG. 9 (*a*) is a magnified sectional view of the metal-air battery 35 in the range C surrounded by a dotted line shown in FIG. 2, and FIG. 9 (*b*) is a schematic sectional view of the metal-air battery 35, along a broken line D-D shown in FIG. 9 (*a*).

The internal connection terminal 20 can have the socket shape as shown in FIGS. 9 (*a*) and (*b*), and the air electrode terminal 18 can have the plug shape as shown in FIGS. 9 (*a*) and (*b*).

Alternatively, the internal connection terminal 20 or the air electrode terminal 18 may have the socket shape provided with a spring to pinch the plug. Consequently, in the case where the plug-shaped terminal is inserted into the socket-shaped terminal, the plug-shaped terminal can be pinched by the socket-shaped terminal, so that the internal connection terminal 20 is allowed to come into contact with the air electrode terminal 18 without a gap. Also, the contact resistance between the internal connection terminal 20 and the air electrode terminal 18 can be reduced. Also, the internal connection terminal 20 can be connected to the air electrode terminal 18 strongly, so that the metal electrode cartridge 6 can be fixed to the metal-air battery main body 37.

Figure 10:
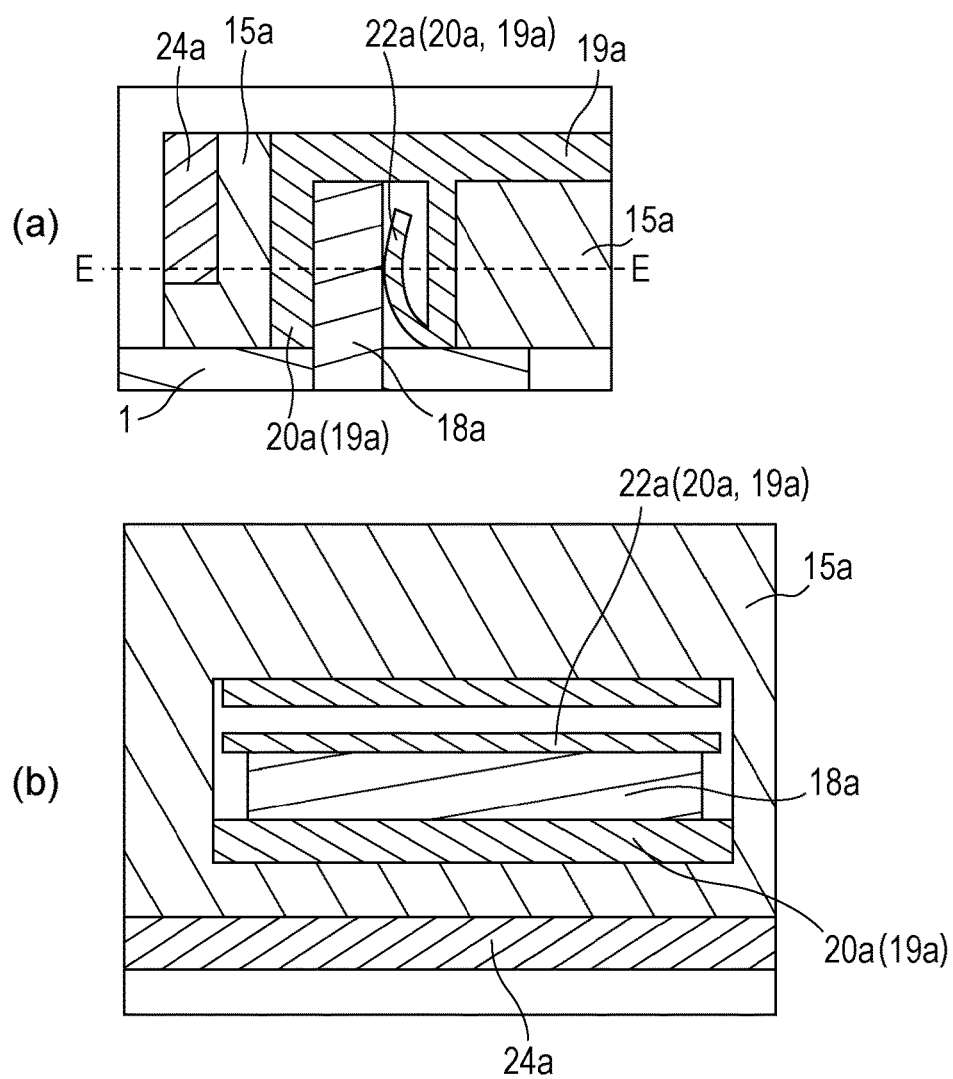
FIG. 10 (a) is a schematic sectional view of part of a metal-air battery according to an embodiment of the present invention, and FIG. 10 (b) is a schematic sectional view of the metal-air battery, along a broken line E-E shown in FIG. 10 (a).

FIG. 10 (*a*) is a schematic sectional view of part of a metal-air battery 35 including the socket-shaped internal connection terminal 20 having a spring 22 and corresponds to a sectional view of the range C surrounded by the dotted line shown in FIG. 2. Also, FIG. 10 (b) is a schematic sectional view, along a broken line E-E shown in FIG. 10 (a).

The internal connection terminal 20 can have the socket shape provided with the spring, as shown in FIGS. 10 (a) and (b), and the air electrode terminal 18 can have the plug shape, as shown in FIGS. 10 (a) and (b).

Also, the air electrode terminal 18 or the internal connection terminal 20 may be disposed in such a way as to have movability and be positioned when the insertion portion 14 is inserted into the electrolytic solution tank 2. Consequently, even in the case where differences occur in positions of the air electrode terminals 18 of a plurality of cells 4, the metal electrode cartridge 6 can be incorporated into the metal-air battery main body 37 smoothly. Also, application of excess load to the air electrode terminal 18 or the internal connection terminal 20 can be suppressed, so that the life of the metal-air battery main body 37 or the metal electrode cartridge 6 can be increased. Also, even in the case where the distance between the air electrode terminals 18 is changed, the metal electrode cartridge 6 can be used on an "as is" basis.

The air electrode terminal 18 or the internal connection terminal 20 can be disposed in such a way as to, for example, be slid in the stacking direction of the cells 4. Consequently, the difference between the air electrode terminal 18 and the internal connection terminal 20 can be eliminated by sliding of the air electrode terminal 18 or the internal connection terminal 20.

In the case where one of the air electrode terminal 18 and the internal connection terminal 20 has the socket shape and the other has the plug shape and, in addition, in the case where the air electrode terminal 18 or the internal connection terminal 20 is disposed in such a way as to be able to slide, the terminal having the socket shape may have an inside wall with a wall-to-wall distance decreasing with increasing proximity to the central hole of the socket. Consequently, the air electrode terminal 18 or the internal connection terminal 20 can be positioned by contact of the terminal having the plug shape with the inside wall of the terminal having the socket shape.

Figure 11:
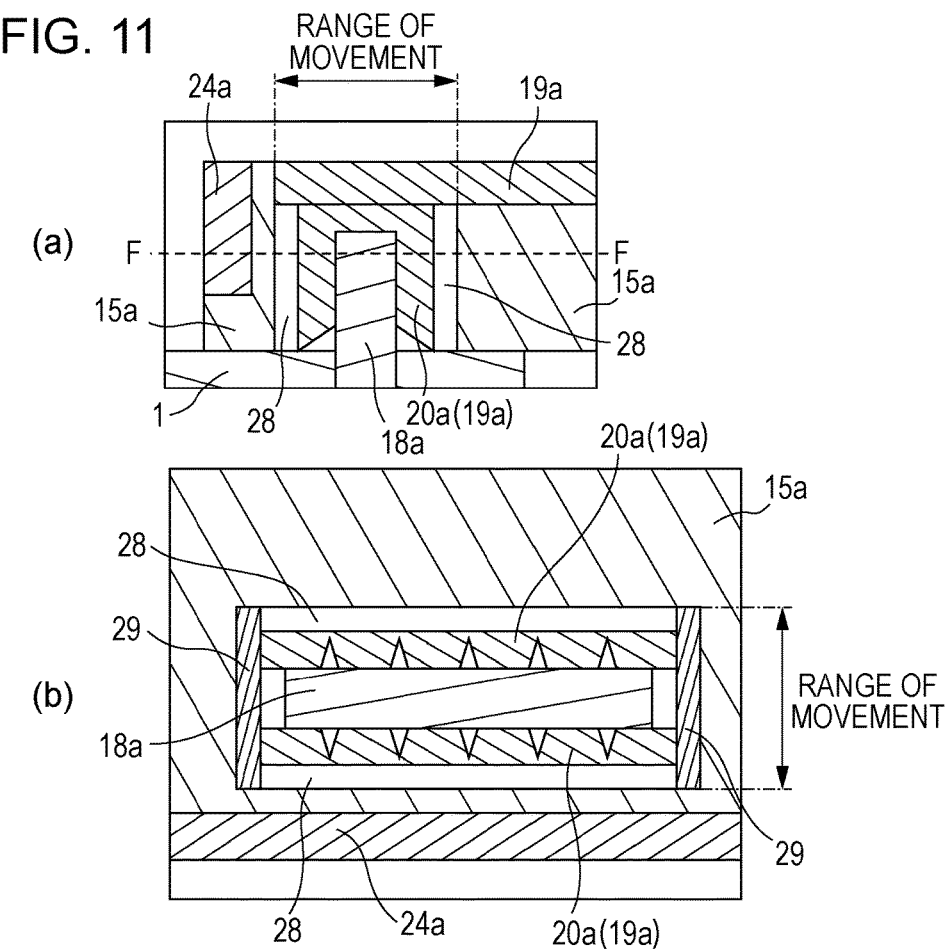
FIG. 11 (a) is a schematic sectional view of part of a metal-air battery according to an embodiment of the present invention, and FIG. 11 (b) is a schematic sectional view of the metal-air battery, along a broken line F-F shown in FIG. 11 (a).

FIG. 11 (a) is a schematic sectional view of part of the metal-air battery 35 and corresponds to a sectional view of the range C surrounded by the dotted line shown in FIG. 2. Meanwhile, FIG. 11 (b) is a schematic sectional view along the broken line F-F shown in FIG. 11 (a). In the metal-air battery 35 shown in FIG. 11, the internal connection terminal 20 has the socket shape and the air electrode terminal 18 has the plug shape. Meanwhile, spaces for movement 28 are disposed on both sides of the internal connection terminal 20. Also, the internal connection terminal 20 is disposed in such a way as to be able to slide to the space for movement 28 side while the upper portion is in contact with the air electrode connection portion 19a by a slide guide 29. Also, the internal connection terminal 20 has an inside wall with a wall-to-wall distance decreasing with increasing proximity to the central hole of the socket. In the case where the internal connection terminal 20 has such a configuration, the internal connection terminal 20 can be slid when the air electrode terminal 18 is connected to the internal connection terminal 20, so that positioning can be performed.

The external connection terminal 21 serves as a terminal on the air electrode side of the cell 4 when the metal electrode cartridge 6 is incorporated into the metal-air battery main body 37. Consequently, the terminal on the air electrode 9 side of the cell 4 can be disposed in the operation portion 16. Preferably, the external connection terminal 21 is disposed while being exposed at the surface of the operation portion 16 and can be disposed on, for example, the side surface of the operation portion 16 as in the case of the operation portion 16 shown in FIGS. 5 (a) and (c) and FIGS. 6 to 8. Consequently, when the metal electrode cartridge 6 is incorporated into the metal-air battery main body 37, the external connection terminal 21 and the terminal or wiring adjacent to the operation portion 16 are allowed to become contact with each other.

The external connection terminal 21 can come into contact with any one of the external wiring, the output terminal 30, the fuel electrode terminal 25 of the adjacent cell 4, and the external connection terminal 21 of the adjacent cell 4 when the metal electrode cartridge 6 is attached to the metal-air battery main body 37. Also, the external connection terminal 21 is allowed to be in no contact with the external wiring, the output terminal 30, the fuel electrode terminal 25 of the adjacent cell 4, and the external connection terminal 21 of the adjacent cell 4 when the metal electrode cartridge 6 is detached from the metal-air battery main body 37.

The electromotive force of the cell 4 can be output externally by attaching the metal electrode cartridge 6 to the metal-air battery main body 37. Also, proceeding of the electrode reaction in the cell 4 can be interrupted by detaching the metal electrode cartridge 6 from the metal-air battery main body 37. In addition, when failures, e.g., rust and deformation, occur at the terminal to output the electromotive force of the cell 4, generation of electricity with the cell 4 can be started again promptly by detaching the metal electrode cartridge 6 from the metal-air battery main body 37 and attaching a new metal electrode cartridge 6 to the metal-air battery main body 37.

Next, the connection method of a plurality of cells 4 in the case where the metal-air battery 35 includes a plurality of cells 4 will be described.

In the case where the metal electrode cartridge 6 is incorporated into the metal-air battery main body 37, the fuel electrode terminal 25 and the external connection terminal 21 serve as the output terminals of the cell 4.

In the case where the metal-air battery 35 includes a plurality of cells and the plurality of cells are connected in series, the fuel electrode terminal 25 and the external connection terminal 21 can be disposed in such a way that the fuel electrode terminal 25 of the metal electrode cartridge 6 comes into contact with the external connection terminal 21 of the adjacent metal electrode cartridge 6. For example, as in the case of the operation portion 16 shown in FIG. 5, a substantially rectangular parallelepiped shape can be employed, the fuel electrode terminal 25 can be disposed on a first side surface of the operation portion 16, and the external connection terminal 21 can be disposed on a second side surface opposite to the first side surface. Incidentally, such a metal electrode cartridge 6 serves as a metal electrode cartridge for series connection use. In this regard, the configurations of the plurality of metal electrode cartridges for series connection use to be incorporated into the metal-air battery 35 may be substantially the same. Consequently, the metal electrode cartridges can have interchangeability. According to this configuration, in the case where the plurality of metal electrode cartridges 6 are connected in series or in parallel, adjacent metal electrode cartridges 6 are aligned easily, the contact area between the fuel electrode terminal 25 and the external connection terminal 21 can be increased, and the contact resistance can be reduced.

In the metal-air battery 35 shown in FIG. 1, three metal electrode cartridges 6 including the operation portion 16 shown in FIG. 5 are incorporated into the metal-air battery main body 37. In the metal-air battery 35 shown in FIG. 1, the fuel electrode terminal 25 of the metal electrode cartridge 6a is in contact with the output terminal 30b. The external connection terminal 21 of the metal electrode cartridge 6a is in contact with the fuel electrode terminal 25 of the metal electrode cartridge 6b. The external connection terminal 21 of the metal electrode cartridge 6b is in contact with the fuel electrode terminal 25 of the metal electrode cartridge 6c. Also, the external connection terminal 21 of the metal electrode cartridge 6c is in contact with an output terminal 30a. The plurality of cells 4 included in the metal-air battery 35 can be connected in series and the electromotive force of the metal-air battery 35 can be output from the output terminals 30a and 30b by employing such a configuration.

In the case where the metal-air battery 35 includes a plurality of cells 4 and the plurality of cells 4 are connected in parallel, the fuel electrode terminal 25 can be disposed in such a way that the fuel electrode terminal 25 of the metal electrode cartridge 6 comes into contact with the fuel electrode terminal 25 of the adjacent metal electrode cartridge 6 and the external connection terminal 21 can be disposed in such a way that the external connection terminal 21 of the metal electrode cartridge 6 comes into contact with the external connection terminal 21 of the adjacent metal electrode cartridge 6. Incidentally, such a metal electrode cartridge 6 serves as a metal electrode cartridge 6 for parallel connection use. In this regard, the configurations of the plurality of metal electrode cartridges for parallel connection use incorporated into the metal-air battery 35 may be substantially the same. Consequently, the metal electrode cartridges can have interchangeability.

Figure 12:
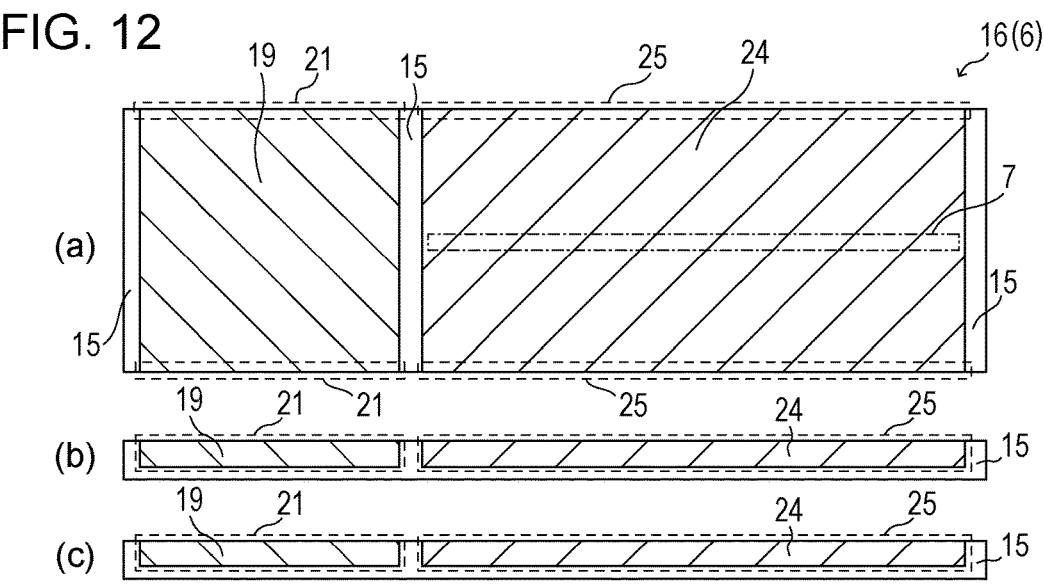
FIG. 12 (*a*) is a schematic top view of an operation portion of a metal electrode cartridge included in a metal-air battery according to an embodiment of the present invention, and each of FIGS. 12 (*b*) and (*c*) is a schematic side view of the above-described operation portion.
Figure 13:
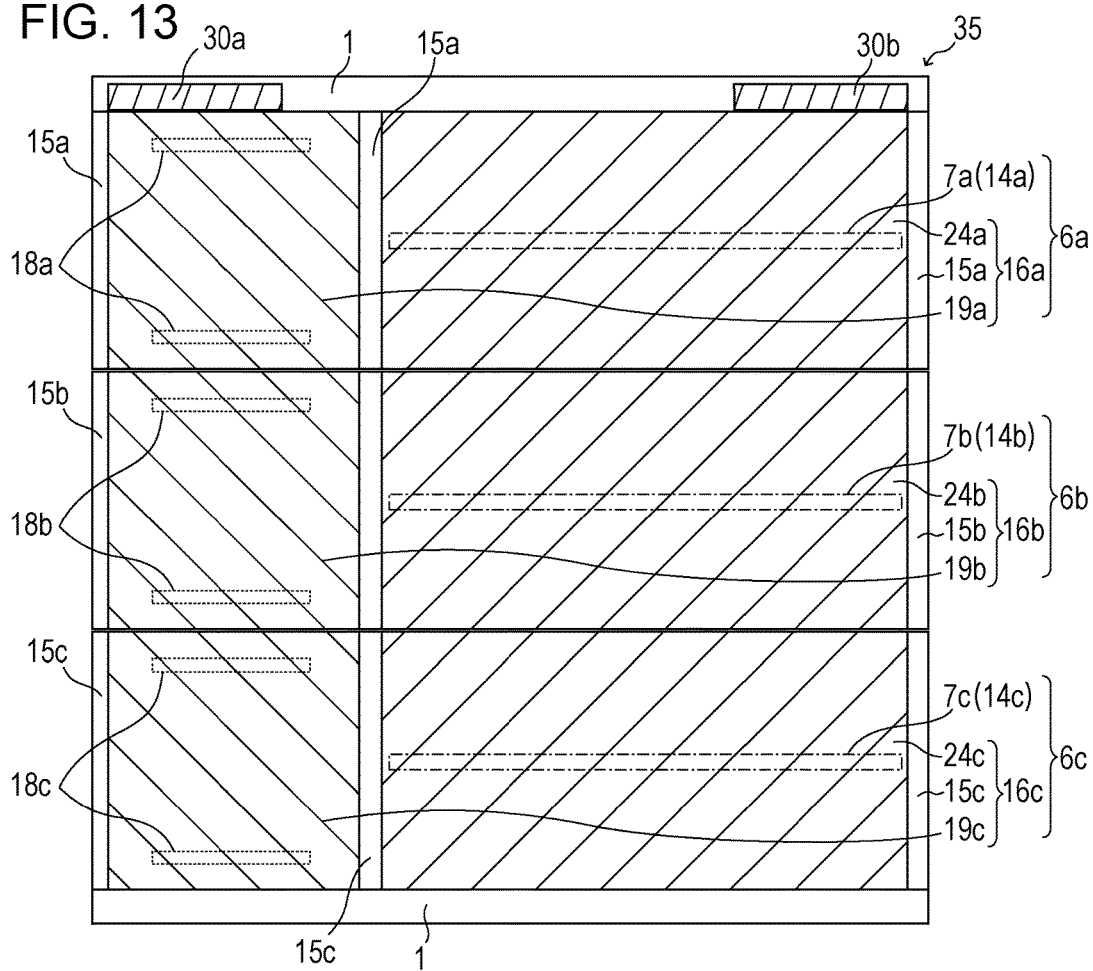
FIG. 13 is a schematic top view of a metal-air battery according to an embodiment of the present invention.

FIG. 12 (a) is a top view of the operation portion 16 included in a metal-air battery 35 according to the present embodiment, and FIGS. 12 (b) and (c) are schematic side views of the operation portion 16 shown in FIG. 12 (a). FIG. 13 is a top view of the metal-air battery 35 incorporated with three metal electrode cartridges 6 including the operation portion 16 shown in FIG. 12.

In the case where the plurality of cells 4 are connected in parallel, for example, the one fuel electrode terminal 25 and one external connection terminal 21 can be disposed on a first side surface of the operation portion 16 and both the other fuel electrode terminal 25 and the other external connection terminal 21 can be disposed on a second side surface opposite to the first side surface, as in the case of the operation portion 16 shown in FIG. 12. Also, the fuel electrode terminal 25 on the second side surface can be disposed in the portion of the second side surface opposite to the portion, which is provided with the fuel electrode terminal 25 on the first side surface, of the first side surface and the external connection terminal 21 on the second side surface can be disposed in the portion of the second side surface opposite to the portion, which is provided with the external connection terminal 21 on the first side surface, of the first side surface.

In this regard, in the case where the fuel electrode 5 is deposited on the fuel electrode collector 7 by a plating method, such a metal electrode cartridge 6 for parallel connection use can be used on an "as is" basis.

In the metal-air battery 35 shown in FIG. 13, three metal electrode cartridges 6 including the operation portion 16 shown in FIG. 12 are incorporated into the metal-air battery main body 37. In the metal-air battery 35 shown in FIG. 13, one fuel electrode terminal 25 of the metal electrode cartridge 6a is in contact with the output terminal 30b. The other fuel electrode terminal 25 of the metal electrode cartridge 6a is in contact with one fuel electrode terminal 25 of the metal electrode cartridge 6b and the other fuel electrode terminal 25 of the metal electrode cartridge 6b is in contact with one fuel electrode terminal 25 of the metal electrode cartridge 6c. Also one external connection terminal 21 of the metal electrode cartridge 6a is in contact with the output terminal 30a. The other external connection terminal 21 of the metal electrode cartridge 6a is in contact with one external connection terminal 21 of the metal electrode cartridge 6b and the other external connection terminal 21 of the metal electrode cartridge 6b is in contact with one external connection terminal 21 of the metal electrode cartridge 6c. The plurality of cells 4 included in the metal-air battery 35 can be connected in parallel and the electromotive force of the metal-air battery 35 can be output from the output terminals 30a and 30b by employing such a configuration.

In this regard, both the metal electrode cartridge 6 for series connection use and the metal electrode cartridge 6 for parallel connection use may be incorporated into the metal-air battery main body 37. Consequently, the output of the metal-air battery 35 can be adjusted.

In the case where the metal electrode cartridge 6 includes a plurality of insertion portions 14, the individual fuel electrodes 5 included in the metal electrode cartridge 6 serve as electrodes of different cells 4. Therefore, the metal electrode cartridge 6 serves as constituent factors of a plurality of cells 4. The plurality of cells 4 can output the electromotive force with the air electrode connection portion 19, the fuel electrode connection portion 24, a connection potion for series connection use 48, and the like.

For example, as in the case of the metal electrode cartridge 6 shown in FIGS. 6 and 7, in the case where the metal electrode cartridge 6 includes two insertion portions 14 and two parallel-connected cells 4 are formed by the metal electrode cartridge 6 being incorporated into the metal-air battery main body 37, the air electrode connection portion 19 included in the operation portion 16 can be electrically connected to the plurality of air electrodes 9 included in the plurality of cells 4 through the respective internal connection terminals 20. Also, the external connection terminal 21 can be disposed on the side surface of the operation portion 16. Also, the fuel electrode connection portion 24 included in the operation portion 16 can come into contact with the fuel electrode collectors 7a and 7b included in two insertion portions 14. Also, the fuel electrode terminal 25 can be disposed on the side surface of the operation portion 16. The plurality of cells 4 formed by the metal electrode cartridge 6 being incorporated into the metal-air battery main body 37 can be connected in parallel by employing such a configuration. Also, in the case where the plurality of metal electrode cartridges 6 are incorporated into the metal-air battery main body 37 in the same manner as the metal-air battery 35 shown in FIG. 13 as well, the cells 4 included in the metal-air battery 35 can be connected in parallel.

As for the metal electrode cartridge 6 shown in FIG. 8, the metal electrode cartridge 6 includes two insertion portions 14 and two cells 4 (first cell and second cell) connected in series are formed by the metal electrode cartridge 6 being incorporated into the metal-air battery main body 37. In this case, the operation portion 16 can include the fuel electrode connection portion 24, the connection potion for series connection use 48, and the air electrode connection portion 19. The fuel electrode connection portion 24 can come into contact with the fuel electrode collector 7a of the first cell and include the fuel electrode terminal 25 on the side surface of the operation portion 16. The connection potion for series connection use 48 can come into contact with the fuel electrode collector 7b of the second cell and include the internal connection terminal 20 electrically connected to the air electrode 9 of the first cell. The air electrode connection portion 19 can include the internal connection terminal 20 electrically connected to the air electrode 9 of the second cell and include the external connection terminal 21 on the side surface of the operation portion 16. The plurality of cells 4 formed by the metal electrode cartridge 6 being incorporated into the metal-air battery main body 37 can be connected in series by employing such a configuration. Also, in the case where the plurality of metal electrode cartridges 6 are incorporated into the metal-air battery main body 37 in the same manner as the metal-air battery 35 shown in FIG. 1 as well, the cells 4 included in the metal-air battery 35 can be connected in series.

In the case where a plurality of metal electrode cartridges 6 are incorporated into the metal-air battery main body 37, the operation portion 16 may be disposed in such a way that the fuel electrode terminal 25 included in one metal electrode cartridge 6 of adjacent two metal electrode cartridges 6 is engaged with the external connection terminal 21 included in the other metal electrode cartridge 6, the operation portion 16 may be disposed in such a way that the fuel electrode terminal 25 included in one metal electrode cartridge 6 of adjacent two metal electrode cartridges 6 is engaged with the fuel electrode terminal 25 included in the other metal electrode cartridge 6, or the operation portion 16 may be disposed in such a way that the external connection terminal 21 included in one metal electrode cartridge 6 of adjacent two metal electrode cartridges 6 is engaged with the external connection terminal 21 included in the other metal electrode cartridge 6. Consequently, the plurality of metal electrode cartridges 6 can be integrated, and an increase in the contact resistance and damages to the metal-air battery main body 37 and the metal electrode cartridge 6 due to movement of the metal electrode cartridge 6 can be suppressed.

Figure 14:
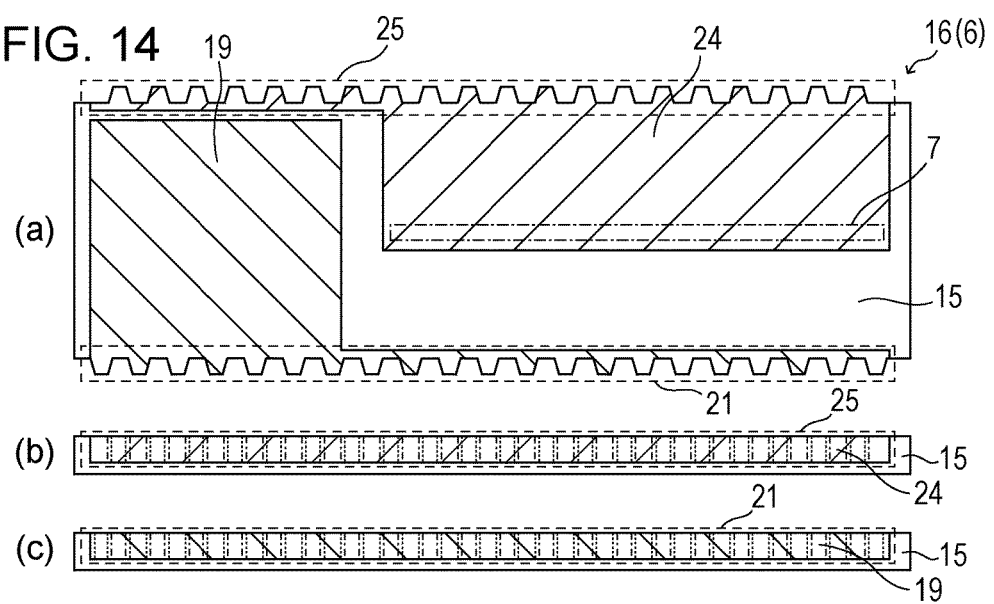
FIG. 14 (*a*) is a schematic top view of an operation portion of a metal electrode cartridge included in a metal-air battery according to an embodiment of the present invention, and each of FIGS. 14 (*b*) and (*c*) is a schematic side view of the above-described operation portion.
Figure 15:
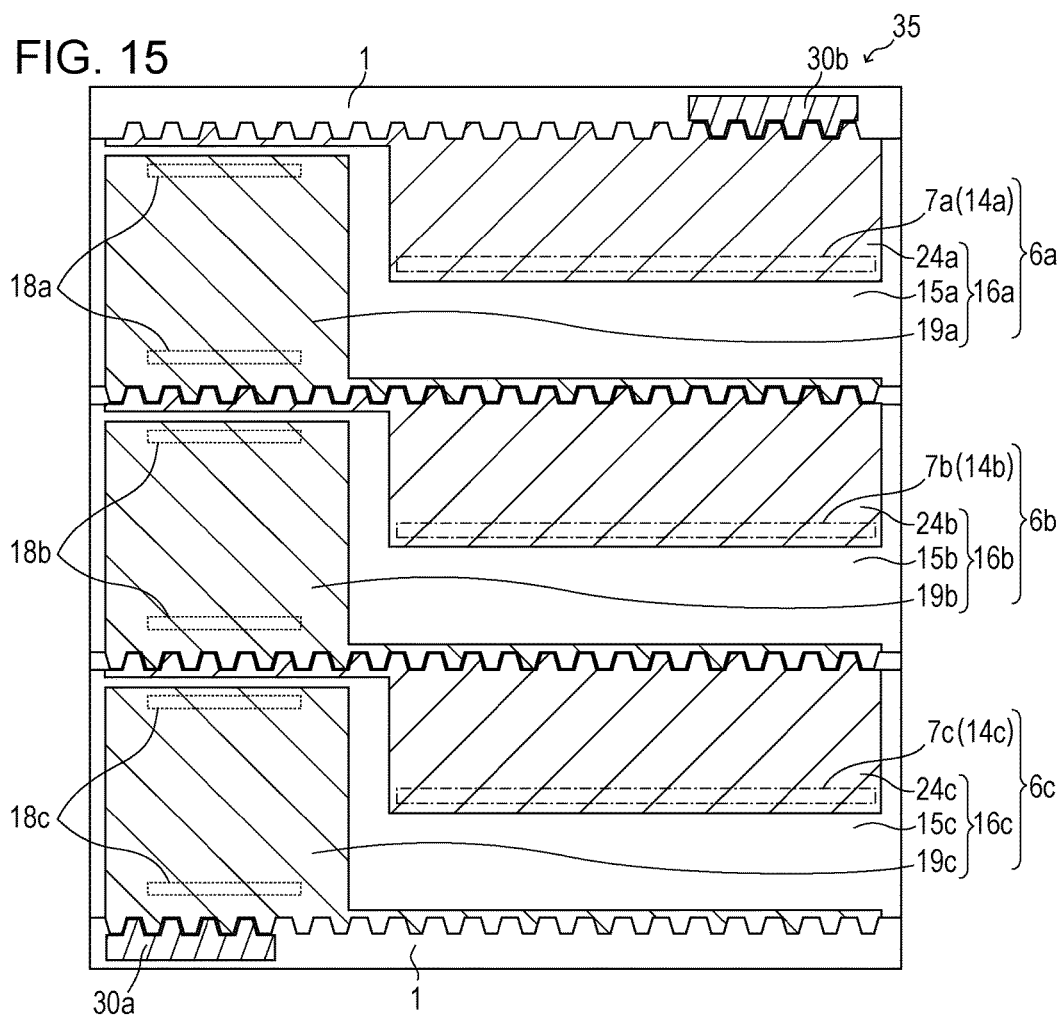
FIG. 15 is a schematic top view of a metal-air battery according to an embodiment of the present invention.

FIG. 14 (a) is a schematic top view of the operation portion 16 included in the metal-air battery 35 according to the present embodiment, and each of FIGS. 14 (b) and (c) is a schematic side view of the operation portion 16 shown in FIG. 14 (a). FIG. 15 is a top view of the metal-air battery 35 incorporated with three metal electrode cartridges 6 including the operation portion 16 shown in FIG. 14. In this regard, in the metal-air battery 35 shown in FIG. 15, three cells 4 included in the metal-air battery 35 are connected in series.

In the operation portion 16 shown in FIG. 14, the fuel electrode terminal 25 provided with concavities and convexities is disposed on a first side surface of the operation portion 16 and the external connection terminal 21 provided with concavities and convexities is disposed on a second side surface opposite to the first side surface provided with the fuel electrode terminal 25. In this regard, convex portions of the external connection terminal 21 are disposed in the portions of the second side surface opposite to the portions, which are provided with concave portions of the fuel electrode terminal 25, of the first side surface and concave portions of the external connection terminal 21 are disposed in the portions of the second side surface opposite to the portions, which are provided with convex portions of the fuel electrode terminal 25, of the first side surface.

In the metal-air battery 35 shown in FIG. 15, three metal electrode cartridges 6 including the operation portion 16 shown in FIG. 14 are incorporated into the metal-air battery main body 37. In the metal-air battery 35 shown in FIG. 15, the fuel electrode terminal 25a of the metal electrode cartridge 6a is in contact with and engaged with the output terminal 30. The external connection terminal 21a of the metal electrode cartridge 6a is in contact with and engaged with the fuel electrode terminal 25b of the metal electrode cartridge 6b. The external connection terminal 21b of the metal electrode cartridge 6b is in contact with and engaged with the fuel electrode terminal 25c of the metal electrode cartridge 6c. Also, the external connection terminal 21c of the metal electrode cartridge 6c is in contact with and is engaged with the output terminal 30a. The metal electrode cartridges 6a to 6c can be integrated by employing such a configuration. Also, the metal electrode cartridges 6a to 6c can be integrated with the metal-air battery main body 37 by engaging the output terminal 30 with the fuel electrode terminal 25 or the external connection terminal 21.

The operation portion 16 may include a switch 40 and a switchable terminal 31. Also, the switchable terminal 31 may be disposed in such a way as to be electrically connected to the fuel electrode terminal 5 or the external connection terminal 21 by the switch 40. According to such a configuration, the switchable terminal 31 is allowed to serve as the terminal on the fuel electrode side by the switch 40. Alternatively, the switchable terminal 31 is allowed to serve as the terminal on the air electrode side by the switch 40. Consequently, the position of the terminal to output the electromotive force of the cell 4 formed by the metal electrode cartridge 6 being incorporated into the metal-air battery main body 37 can be changed and the metal electrode cartridge 6 can be switched back and forth between for series connection use and for parallel connection use. Also, the connection method can be changed by the switch while the metal electrode cartridge 6 is incorporated in the metal-air battery main body 37 and the output of the metal-air battery 37 can be adjusted. Also, it is possible to specify the metal electrode cartridge 6 to be for parallel connection use in the case where the fuel electrode 5 is formed on the fuel electrode collector 7 by a plating method and specify the metal electrode cartridge 6 to be for series connection use in the case where the metal-air battery 37 generates electricity.

Figure 16:
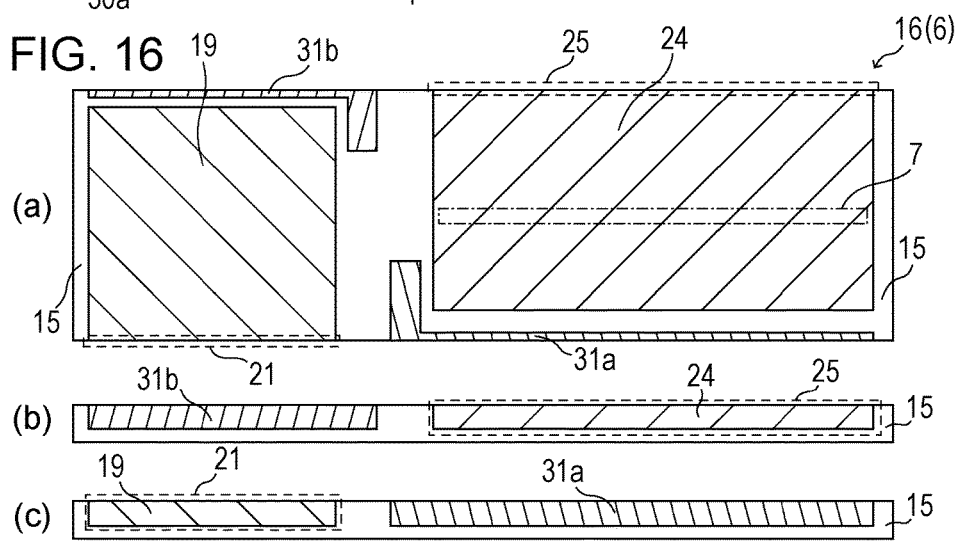
FIG. 16 (*a*) is a schematic top view of an operation portion of a metal electrode cartridge included in a metal-air battery according to an embodiment of the present invention, and each of FIGS. 16 (*b*) and (*c*) is a schematic side view of the above-described operation portion.
Figure 20:
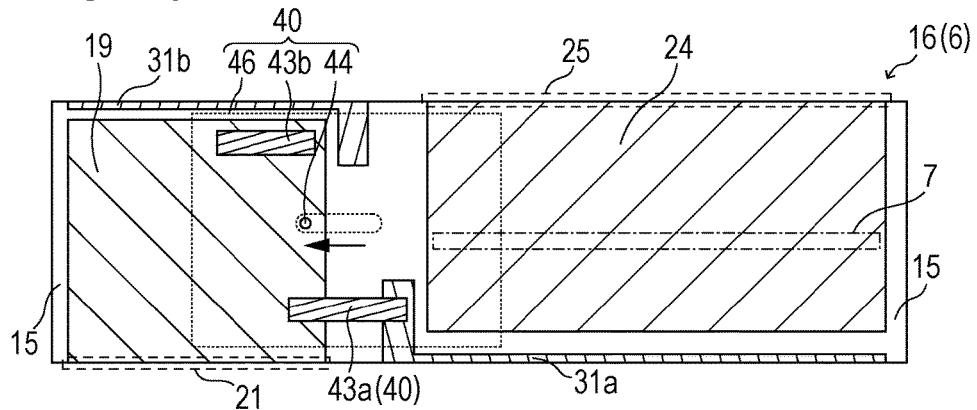
FIG. 20 is a schematic top view of a metal electrode cartridge included in a metal-air battery according to an embodiment of the present invention.
Figure 21:
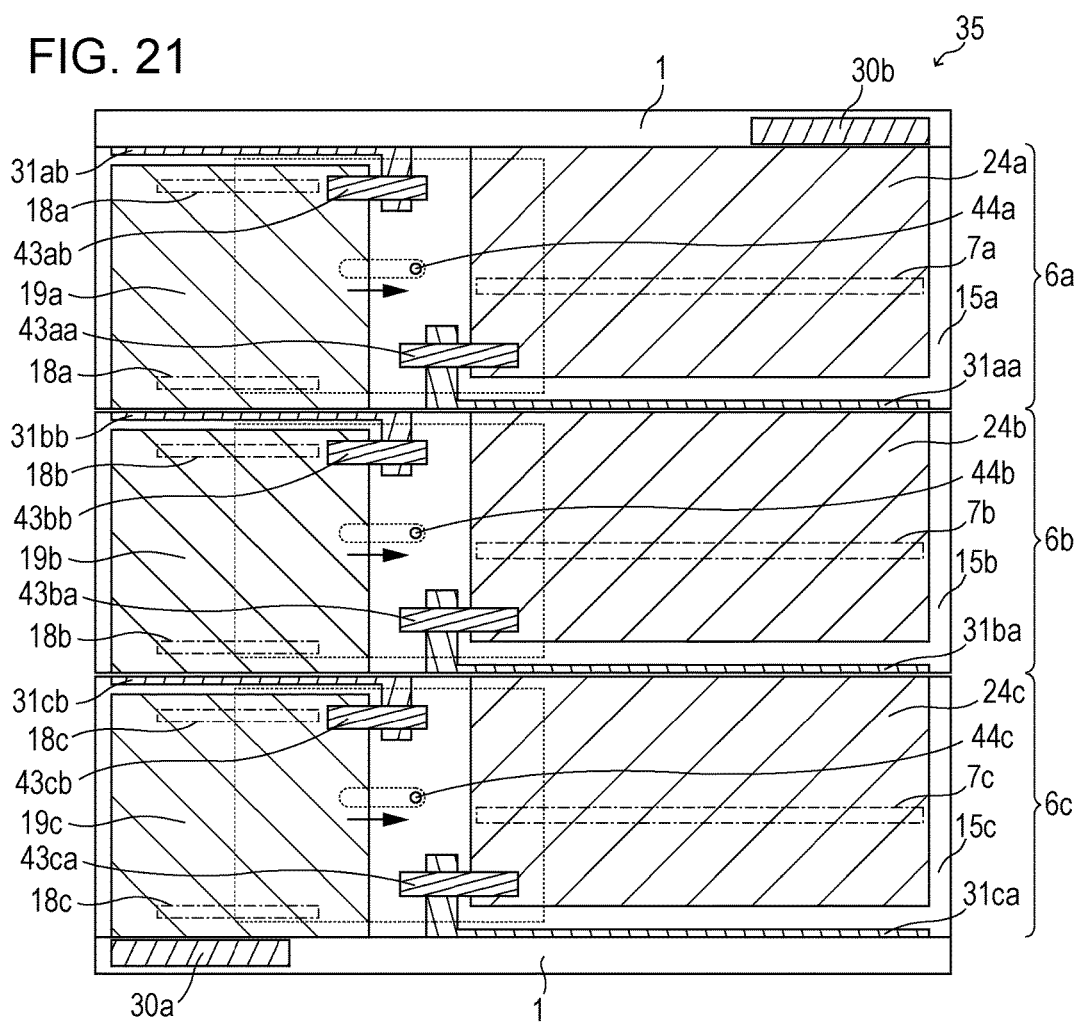
FIG. 21 is a schematic top view of a metal-air battery according to an embodiment of the present invention.
Figure 22:
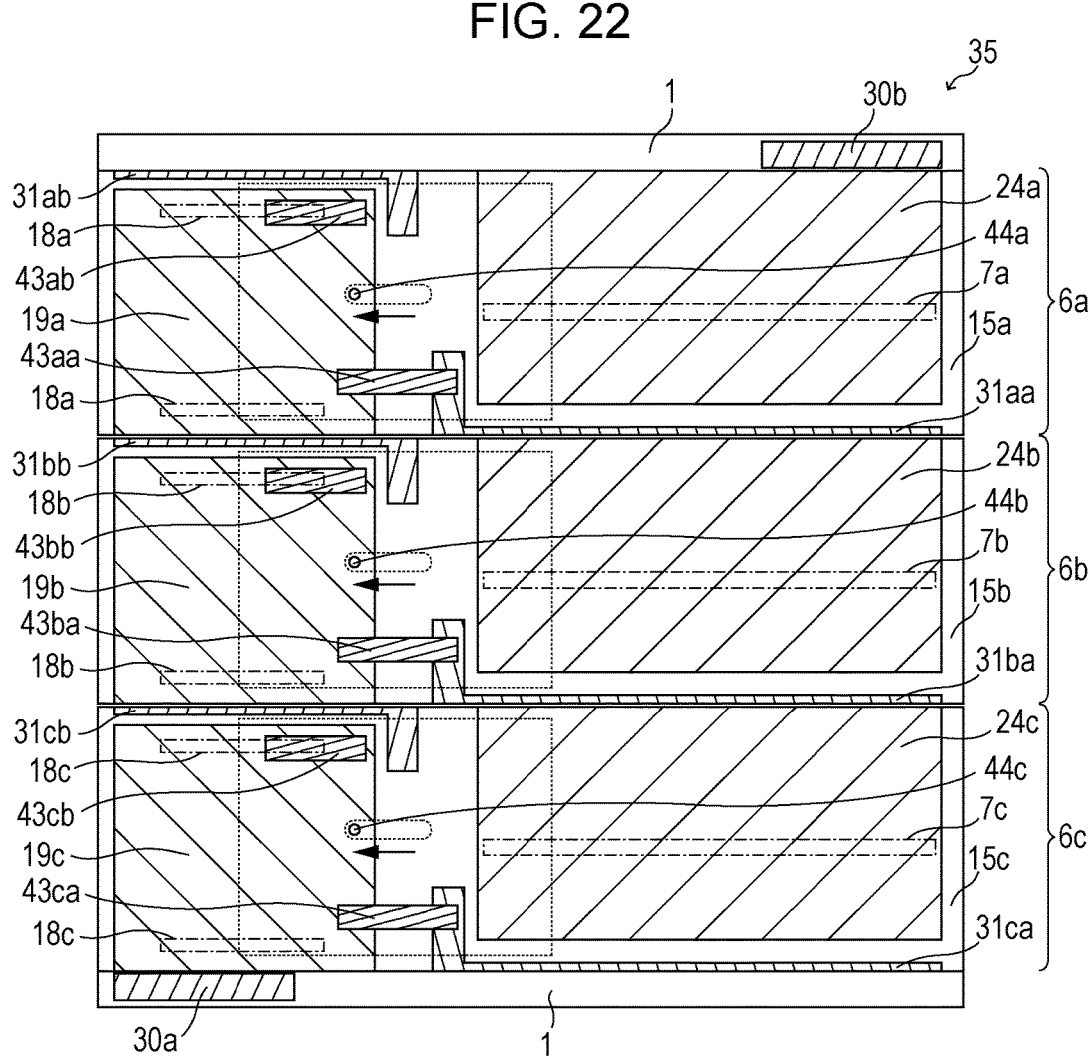
FIG. 22 is a schematic top view of a metal-air battery according to an embodiment of the present invention.

FIG. 16 (a) is a schematic top view of the operation portion 16 before the switch 40 is attached, and each of FIGS. 16 (b) and (c) is a schematic side view of the operation portion 16 shown in FIG. 16 (a). FIG. 17 is a schematic top view of the operation portion 16 after the switch 40 is attached. FIG. 18 is a schematic sectional view of the metal electrode cartridge 6, along a broken line G-G shown in FIG. 17. FIG. 19 is a schematic top view of the metal electrode cartridge 6 switched to for parallel connection use by the switch 40. FIG. 20 is a schematic top view of the metal electrode cartridge 6 switched to for series connection use by the switch. Also, FIG. 21 is a top view of the metal-air battery 35 incorporated with three metal electrode cartridges 6 including the operation portion 16 shown in FIG. 19. In this regard, in the metal-air battery 35 shown in FIG. 21, the three cells 4 included in the metal-air battery 35 are connected in parallel. FIG. 22 is a top view of the metal-air battery 35 incorporated with three metal electrode cartridges 6 including the operation portion 16 shown in FIG. 20. In this regard, in the metal-air battery 35 shown in FIG. 22, the three cells 4 included in the metal-air battery 35 are connected in series.

Incidentally, for the sake of understanding the electrical connection, part of the switch 40 is not shown in FIGS. 19 to 22.

The switchable terminal 31 is disposed in such a way as to be able to switch the metal electrode cartridge 6 back and forth between for series connection use and for parallel connection use. For example, as in the case of the operation portion 16 shown in FIG. 16, it is possible that the fuel electrode terminal 25 and the switchable terminal 31b are disposed on a first side surface of the operation portion 16 and the external connection terminal 21 and the switchable terminal 31a are disposed on a second side surface opposite to the first side surface. Also, it is possible that the switchable terminal 31a is disposed on a portion of the second side surface opposite to a portion, which is provided with the fuel electrode terminal 25, of the first surface and the switchable terminal 31b is disposed on a portion of the second side surface opposite to a portion, which is provided with the external connection terminal 21, of the second surface.

In this regard, in the state in which the switch 40 is not disposed, the switchable terminal 31 is electrically cut from the fuel electrode terminal 25 and is electrically cut from the external connection terminal 21.

The switch 40 is disposed in such a way as to be able to electrically connect the switchable terminal 31 and the fuel electrode terminal 5 or the external connection terminal 21. For example, as shown in FIGS. 17 to 20, the switch 40 including a slide portion 41 and a guide portion 46 can be disposed on the upper surface of the operation portion 16. The slide portion 41 can be disposed in such a way as to include an insulating portion 42, electrically conductive portions 43a and 43b, and a knob 44 and be slid along the guide portion 46 by moving the knob 44.

The insulating portion 42 and the electrically conductive portion 43 can be disposed in such a way that electrical connection between the fuel electrode terminal 31 and the switchable terminal 31 and electrical cutoff can be switched by sliding of the slide portion 41. Also, the insulating portion 42 and the electrically conductive portion 43 can be disposed in such a way that electrical connection between the external connection terminal 21 and the switchable terminal 31 and electrical cutoff can be switched by sliding of the slide portion 41.

As for the switch 40 shown in FIG. 17 to FIG. 20, in the case where the knob 44 is moved as shown in FIG. 19 and the slide portion 41 is slid, the switchable terminal 31a is electrically connected to the fuel electrode connection portion 24 with the electrically conductive portion 43a and is electrically cut from the air electrode connection portion 19. Also, in the case where the slide portion 41 is slid as shown in FIG. 19, the switchable terminal 31b is electrically connected to the air electrode connection portion 19 with the electrically conductive portion 43b. Therefore, the switchable terminal 31a can be functioned as a terminal on the fuel electrode side of the cell 4 and the switchable terminal 31b can be functioned as a terminal on the air electrode side of the cell 4. In this manner, the metal electrode cartridge 6 can be specified to be for parallel connection use by sliding the slide portion 41.

In the metal-air battery 35 shown in FIG. 21, three metal electrode cartridges 6 including the operation portion 16, in which the slide portion 41 is slid as shown in FIG. 19, are incorporated into the metal-air battery main body 37. In the metal-air battery 35 shown in FIG. 21, the fuel electrode terminal 25 of the metal electrode cartridge 6a is in contact with the output terminal 30b. The switchable terminal 31aa of the metal electrode cartridge 6a is in contact with the upper side fuel electrode terminal 25 of the metal electrode cartridge 6b and the switchable terminal 31ba of the metal electrode cartridge 6b is in contact with the fuel electrode terminal 25 of the metal electrode cartridge 6c.

Also, the external connection terminal 21 of the metal electrode cartridge 6a is in contact with the switchable terminal 31bb of the metal electrode cartridge 6b and the external connection terminal 21 of the metal electrode cartridge 6b is in contact with the switchable terminal 31cb of the metal electrode cartridge 6c. Also, the external connection terminal 21 of the metal electrode cartridge 6c is in contact with the output terminal 30a. The plurality of cells 4 included in the metal-air battery 35 can be connected in parallel and the electromotive force of the metal-air battery 35 can be output from the output terminals 30a and 30b by employing such a configuration.

As for the switch shown in FIG. 17 to FIG. 20, in the case where the knob 44 is moved as shown in FIG. 20 and the slide portion 41 is slid, the switchable terminal 31a is electrically connected to the air electrode connection portion 19 with the electrically conductive portion 43a and is electrically cut from the fuel electrode connection portion 24. Also, in the case where the slide portion 41 is slid as shown in FIG. 20, the switchable terminal 31b is electrically cut from the air electrode connection portion 19. Therefore, the switchable terminal 31a can be functioned as a terminal on the fuel electrode side of the cell 4. In this manner, the metal electrode cartridge 6 can be specified to be for series connection use by sliding the slide portion 41.

In the metal-air battery 35 shown in FIG. 22, three metal electrode cartridges 6 including the operation portion 16, in which the slide portion 41 is slid as shown in FIG. 20, are incorporated into the metal-air battery main body 37. In the metal-air battery 35 shown in FIG. 22, the fuel electrode terminal 25 of the metal electrode cartridge 6a is in contact with the output terminal 30b. The switchable terminal 31aa of the metal electrode cartridge 6a is in contact with the fuel electrode terminal 25 of the metal electrode cartridge 6b and the switchable terminal 31ba of the metal electrode cartridge 6b is in contact with the fuel electrode terminal 25 of the metal electrode cartridge 6c. Also, the external connection terminal 21 of the metal electrode cartridge 6c is in contact with the output terminal 30a. The plurality of cells 4 included in the metal-air battery 35 can be connected in series and the electromotive force of the metal-air battery 35 can be output from the output terminals 30a and 30b by employing such a configuration.

REFERENCE SIGNS LIST

1: casing 2: electrolytic solution tank 3: electrolytic solution 4, 4a, 4b, 4c: cell 5, 5a, 5b, 5c: fuel electrode 6, 6a, 6b, 6c: metal electrode cartridge 7, 7a, 7b, 7c: fuel electrode collector 8, 8a, 8b, 8c: ion exchange membrane 9, 9a, 9b, 9c: air electrode 10, 10a, 10b, 10c: air electrode collector 12: air flow path 13: flow path member 14, 14a, 14b, 14c: insertion portion 15, 15a, 15b, 15c: base member 16, 16a, 16b, 16c: operation portion 18, 18a, 18b, 18c: air electrode terminal 19, 19a, 19b, 19c: air electrode connection portion 20, 20a, 20b, 20c: internal connection terminal 21, 21a, 21b, 21c: external connection terminal 22: spring 24, 24a, 24b, 24c: fuel electrode connection portion 25, 25a, 25b, 25c: fuel electrode terminal 27: insulating member 28: space for movement 29: slide guide 30, 30a, 30b: output terminal 31, 31a, 31b: switchable terminal 35: metal-air battery 37: metal-air battery main body 40: switch 41: slide portion 42: insulating portion 43, 43a, 43b: electrically conductive portion 44, 44a, 44b, 44c: knob 46: guide portion 48: connection potion for series connection use

The invention claimed is:

1. A metal-air battery comprising:
a metal-air battery main body; and
a first metal electrode cartridge, wherein
the first metal electrode cartridge includes a first operation portion and a first insertion portion extended from the first operation portion,
the first insertion portion includes a first fuel electrode containing a metal serving as an electrode active material,
the first operation portion includes a first fuel electrode terminal electrically connected to the first fuel electrode and a first air electrode connection portion,
the first air electrode connection portion includes a first internal connection terminal and a first external connection terminal,
the metal-air battery main body includes a first electrolytic solution tank, a first air electrode, and a first air electrode terminal electrically connected to the first air electrode,
the first fuel electrode terminal is exposed at a first side surface of the first operation portion,
the first external connection terminal is exposed at a second side surface of the first operation portion, and
the first internal connection terminal is disposed in such a way as to come into contact with the first air electrode terminal by inserting the first insertion portion into the first electrolytic solution tank.

2. The metal-air battery according to claim 1, wherein
the first operation portion is in a shape of a rectangular parallelepiped, and
the first external connection terminal is disposed on the second side surface opposite to the first side surface of the first operation portion.

3. The metal-air battery according to claim 2, wherein
the first fuel electrode terminal is included in a pair of first fuel electrode terminals,
one of the pair of first fuel electrode terminals is disposed on the first side surface, and another of the pair of first fuel electrode terminals is disposed on the second side surface,
the first external connection terminal is included in a pair of first external connection terminals, and
one of the pair of first external connection terminals is disposed on the second side surface, and another of the pair of first external connection terminals is disposed on the first side surface.

4. The metal-air battery according to claim 1, wherein one of the first air electrode terminal and the first internal connection terminal serves as a socket and the other serves as a plug.

5. The metal-air battery according to claim 1, wherein
the first operation portion includes a switch and switchable terminals disposed on both the first side surface and the second side surface, and
the switchable terminal is disposed in such a way as to be electrically connected to the first fuel electrode terminal or the first external connection terminal by the switch.

6. The metal-air battery according to claim 1, further comprising a second metal electrode cartridge, wherein
the metal-air battery main body further includes a second electrolytic solution tank, a second air electrode, and a second air electrode terminal electrically connected to the second air electrode,
the second metal electrode cartridge includes a second operation portion and a second insertion portion which is extended from the second operation portion and which can be inserted into the second electrolytic solution tank,
the second insertion portion includes a second fuel electrode containing a metal serving as an electrode active material,
the second operation portion includes a second fuel electrode terminal electrically connected to the second fuel electrode and a second air electrode connection portion,
the second air electrode connection portion includes a second internal connection terminal and a second external connection terminal,
the second internal connection terminal is disposed in such a way as to come into contact with the second air electrode terminal by inserting the second insertion portion into the second electrolytic solution tank, and
the first fuel electrode terminal is disposed in such a way as to come into contact with one of the second fuel electrode terminal and the second external connection terminal by inserting the first insertion portion into the first electrolytic solution tank and inserting the second insertion portion into the second electrolytic solution tank.

7. The metal-air battery according to claim 1, wherein
the metal-air battery main body further includes a third electrolytic solution tank and a third air electrode,
the first metal electrode cartridge includes a third insertion portion which is extended from the first operation portion and which can be inserted into the third electrolytic solution tank, and
the third insertion portion includes a third fuel electrode containing a metal serving as an electrode active material.

8. The metal-air battery according to claim 1, wherein the second side surface is separated away from the first side surface.

9. The metal-air battery according to claim 1, wherein
the first fuel electrode terminal is included in a plurality of first fuel electrode terminals,
the first external connection terminal is included in a plurality of first external connection terminals, and
the metal-air battery includes a plurality of cells, each of the plurality of cells including one of the plurality of first fuel electrode terminals and one of the plurality of first external electrode terminals.

10. The metal-air battery according to claim 9, wherein the plurality of cells are connected in series by electrically connecting each of the plurality of first fuel electrode terminals to a corresponding one of the plurality of first external connection terminals of an adjacent cell.

11. The metal-air battery according to claim 9, wherein the plurality of cells are connected in parallel by electrically connecting each of the plurality of first fuel electrode terminals to one another and electrically connecting each of the plurality of first external connection terminals to one another.

* * * * *